United States Patent
Ma

(10) Patent No.: US 8,243,244 B2
(45) Date of Patent: Aug. 14, 2012

(54) LIQUID CRYSTAL DISPLAY DEVICE AND MANUFACTURING METHOD THEREOF

(75) Inventor: Won-Seok Ma, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1175 days.

(21) Appl. No.: 11/932,598

(22) Filed: Oct. 31, 2007

(65) Prior Publication Data

US 2008/0129670 A1    Jun. 5, 2008

(30) Foreign Application Priority Data

Nov. 15, 2006    (KR) .................. 10-2006-0112798

(51) Int. Cl.
*G02F 1/1343*    (2006.01)

(52) U.S. Cl. .................. 349/145; 349/38; 349/39

(58) Field of Classification Search .................. 349/38, 349/39, 145
See application file for complete search history.

(56) References Cited

U.S. PATENT DOCUMENTS

| | | | | |
|---|---|---|---|---|
| 5,822,026 A | * | 10/1998 | Matsuo | 349/38 |
| 6,172,729 B1 | * | 1/2001 | Ikeda | 349/145 |

FOREIGN PATENT DOCUMENTS

| | | |
|---|---|---|
| JP | 08-240812 | 9/1996 |
| JP | 09-022026 | 1/1997 |
| JP | 10-282527 | 10/1998 |
| JP | 2001-005025 | 1/2001 |
| JP | 2002-156654 | 5/2002 |
| JP | 2004-133028 | 4/2004 |
| JP | 2004-246190 | 9/2004 |
| KR | 2000-0027161 | 5/2000 |
| KR | 10-0350333 | 8/2002 |

* cited by examiner

*Primary Examiner* — Richard Kim
*Assistant Examiner* — David Chung
(74) *Attorney, Agent, or Firm* — Innovation Counsel LLP

(57) ABSTRACT

A liquid crystal display device for preventing a vertical line defect includes sub-pixels arranged repeatedly in order of red, green, and blue along an N-th (where N is a natural number) horizontal line, and sub-pixels formed in a staggered structure with the N-th horizontal line and arranged repeatedly in order of green, blue, and red along an (N+1)-th horizontal line. Gate lines are formed along the horizontal lines. Data lines are formed to cross the gate lines with a gate insulating layer disposed therebetween and formed to be bent along the sub-pixels of the staggered structure. Thin film transistors are connected to the gate lines and to the data lines and pixel electrodes are connected to the thin film transistors. Storage electrodes overlap the pixel electrodes with the gate insulating layer and a passivation layer disposed therebetween to form storage capacitors. The capacitance of a red storage capacitor of the (N+1)-th horizontal line is greater than the capacitance of a red storage capacitor of the N-th horizontal line.

20 Claims, 22 Drawing Sheets

FIG.6

| (R1) Cst1=1 | (G1) Cst2=Cst1×2.5 | (B1) Cst3=Cst1×2.5 |
| --- | --- | --- |
| (G2) Cst4=Cst1×1.5 | (B2) Cst5=Cst1×1.5 | (R2) Cst6=Cst1×3 | (G2) Cst4=Cst1×1.5 |
| (R1) Cst1=1 | (G1) Cst2=Cst1×2.5 | (B1) Cst3=Cst1×2.5 |

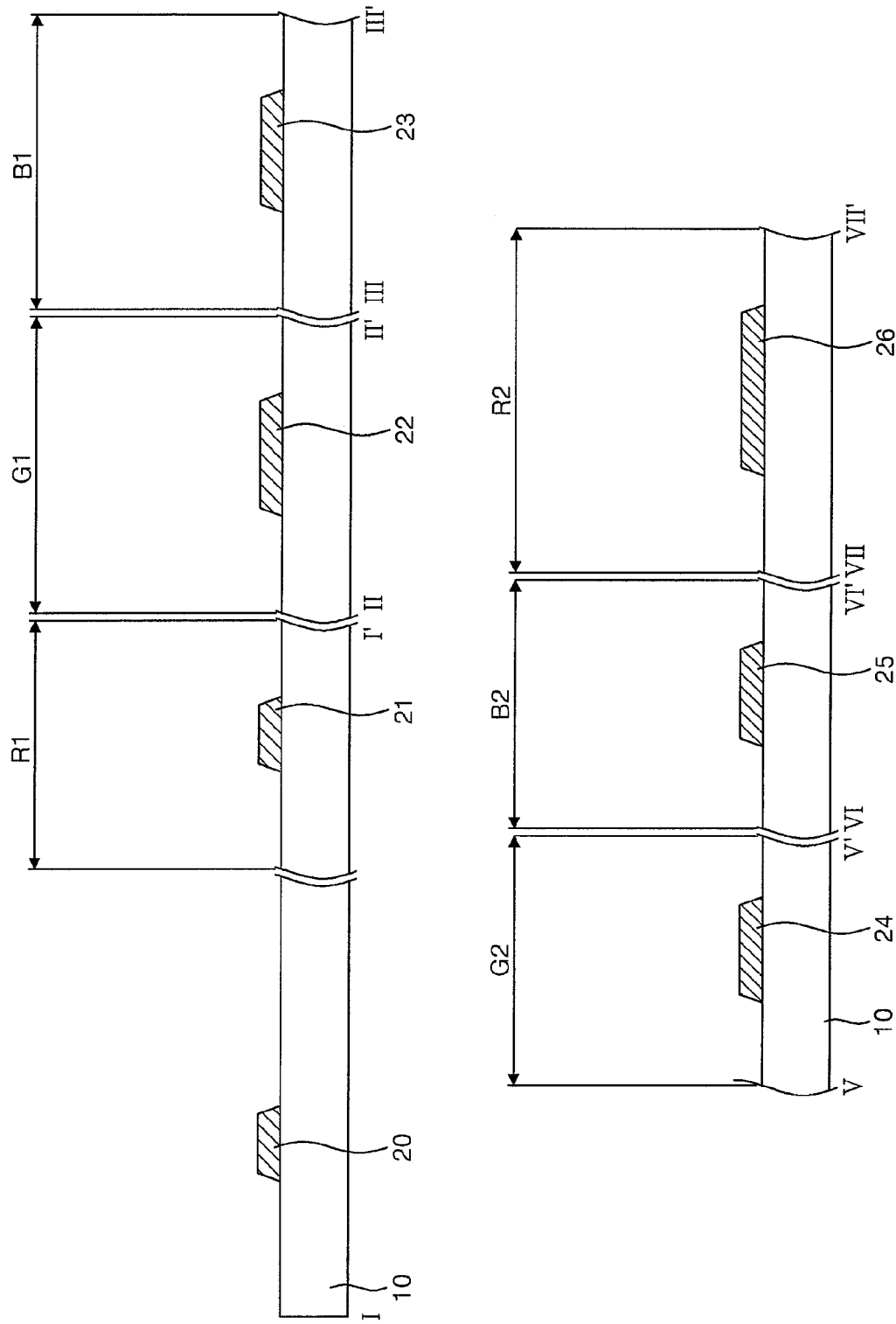

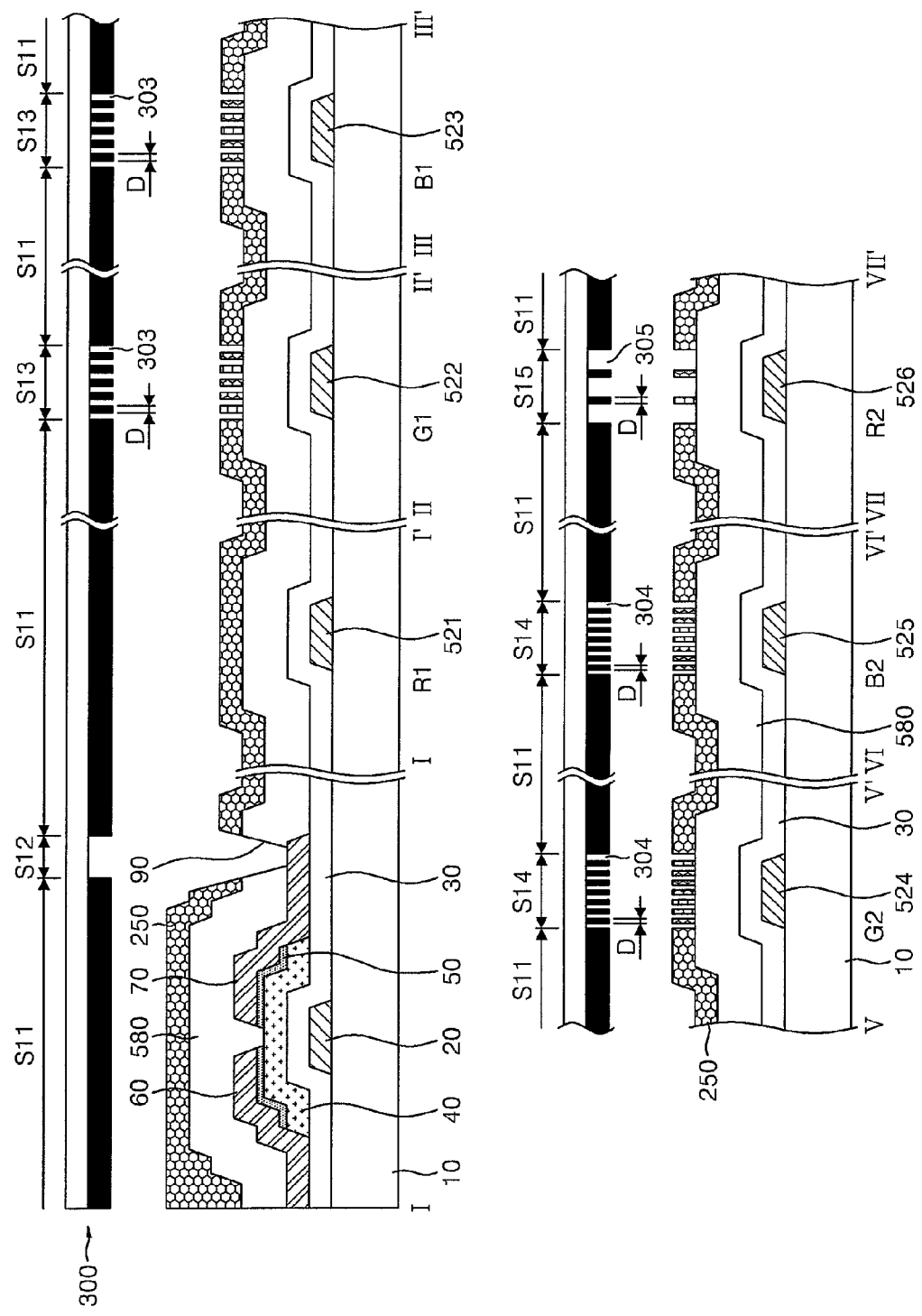

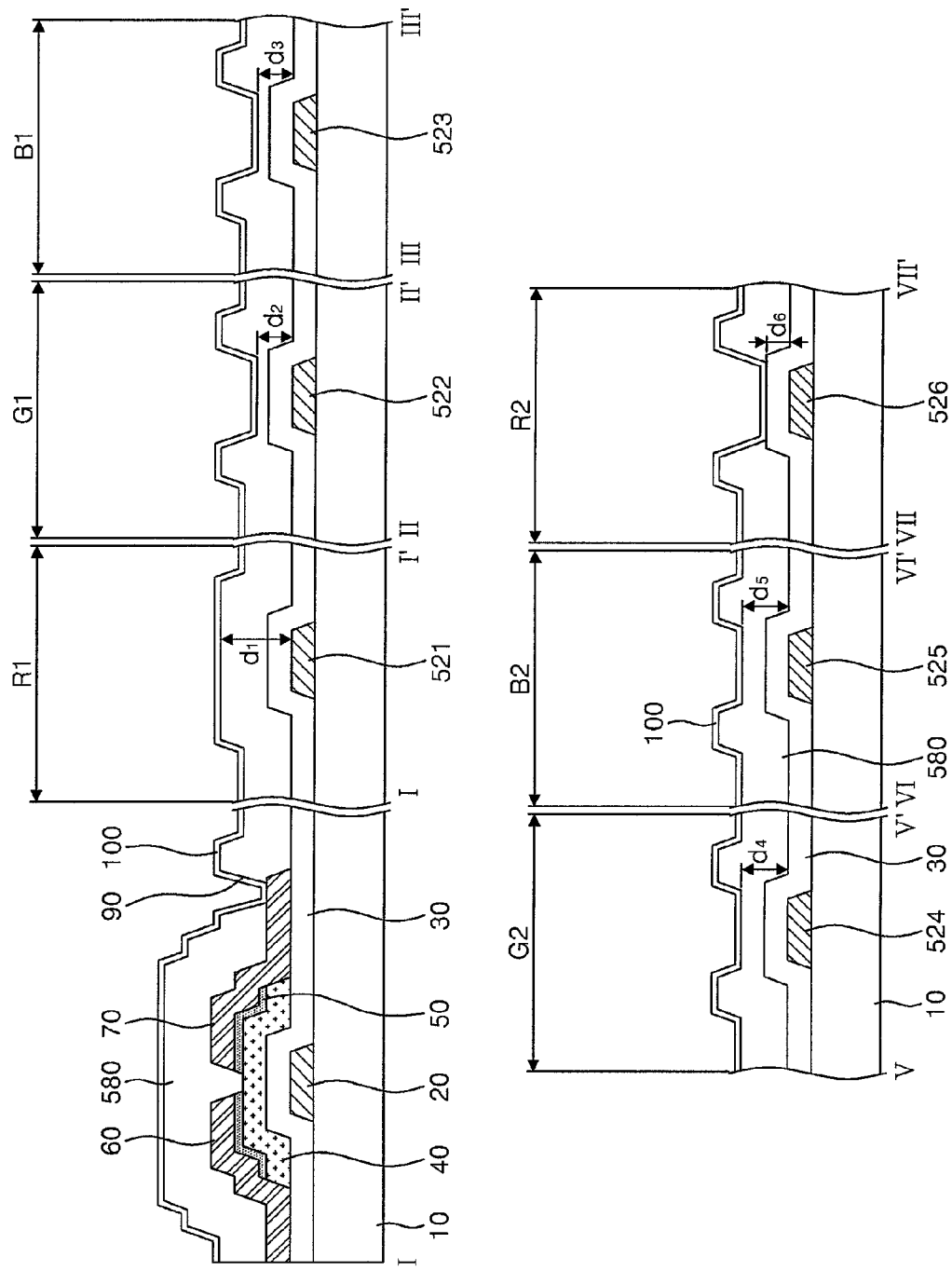

LIQUID CRYSTAL DISPLAY DEVICE AND MANUFACTURING METHOD THEREOF

CROSS REFERENCE TO RELATED APPLICATIONS

This application claims priority to Korean Patent Application No. 2006-0112798 filed on Nov. 15, 2006 and all the benefits accruing therefrom under 35 U.S.C. §119, and the contents of which in its entirety are herein incorporated by reference.

BACKGROUND OF THE INVENTION

1. Field of the Invention

The present invention relates to liquid crystal display ("LCD") devices and, more particularly, to an LCD device and a manufacturing method that prevents vertical line defects of sub-pixels arranged in a delta shape.

2. Description of the Related Art

The LCD device typically employs a thin film transistor ("TFT") substrate that includes gate lines supplying scan signals, data lines supplying data signals that intersect the gate lines (with a gate insulating layer disposed therebetween), TFTs connected between the gate lines and the data lines, and pixel electrodes connected to the TFTs and formed in red (R), green (G), blue (B) pixel regions.

A TFT includes a gate electrode connected to a gate line, a source electrode connected to a data line, a drain electrode connected to a pixel electrode, a semiconductor layer for forming a channel between the source electrode and the drain electrode while overlapping the gate electrode with a gate insulating layer disposed therebetween, and an ohmic contact layer for providing ohmic contact between the semiconductor layer and the source and drain electrodes. The TFT supplies a pixel data signal of the data line to the pixel electrode in response to a scan signal of the gate line.

Upon receiving the pixel data signal from the TFT, the pixel electrode drives liquid crystal molecules by using a voltage difference with a common electrode of a color filter substrate, thereby varying light transmittance. The gate lines are parallel to each other in a transverse direction and supply the scan signals to the TFTs.

A low-resolution display device, such as a digital still camera, employs video information to express images rather than characters uses a TFT substrate having a delta pixel arrangement suitable for curve expression.

The data lines are bent so as to prevent the data lines from overlapping the pixel electrodes arranged in a delta shape and supply the video data signals to the TFTs. The pixel electrodes of a delta arrangement are formed such that a sub-pixel region of the first horizontal direction is arranged in order of red R1, green G1, and blue B1, and a sub-pixel region of the second horizontal direction is arranged in order of green G2, blue B2, and red R2. The sub-pixels of the first horizontal direction and the sub-pixels of the second horizontal directions are repeatedly formed. The red sub-pixel of the first horizontal direction and the green and blue sub-pixels of the second horizontal direction constitute one pixel. In the LCD device of a delta-shaped sub-pixel arrangement, three data lines are connected to one output node of the first data driver. Each time a scan signal is supplied, a pixel data signal is sequentially supplied to the three data lines.

When three data lines are connected to one output node of a data driver, a pixel data signal charged to the first pixel electrode of the first gate line and a pixel data signal charged to the third pixel electrode of the next gate line are different in a charging time. Accordingly, display defects, for example, vertical line defects occur due to the difference between charging rates of the pixel electrodes expressing the same color.

BRIEF SUMMARY OF THE INVENTION

The present invention provides an LCD device and a manufacturing method thereof capable of preventing vertical line defects caused by the difference of a charging rate of a red sub-pixel by more increasing the capacitance of a storage capacitor of a red sub-pixel arranged along a second horizontal line than the capacitance of a storage capacitor of a red sub-pixel arranged along a first horizontal line.

In accordance with an exemplary embodiment of the present invention, a liquid crystal display device includes sub-pixels arranged repeatedly in order of red, green, and blue along an N-th (where N is a natural number) horizontal line, and sub-pixels formed in a staggered structure with the N-th horizontal line and arranged repeatedly in order of green, blue, and red along an (N+1)-th horizontal line; gate lines formed along the horizontal lines; data lines formed to cross the gate lines with a gate insulating layer disposed therebetween and formed to be bent along the sub-pixels of the staggered structure; thin film transistors connected to the gate lines and to the data lines; pixel electrodes connected to the thin film transistors; and storage electrodes overlapping the pixel electrodes with the gate insulating layer and a passivation layer disposed therebetween to form red, green, and blue storage capacitors, wherein the capacitance of a red storage capacitor of the (N+1)-th horizontal line is greater than the capacitance of a red storage capacitor of the N-th horizontal line.

In some embodiments, the capacitance of each of the green and blue storage capacitors of the N-th horizontal line is greater than the capacitance of the red storage capacitor of the N-th horizontal line, and the capacitance of each of the green and blue storage capacitors of the (N+1)-th horizontal line is less than the capacitance of the red storage capacitor of the (N+1)-th horizontal line.

In some embodiments, the capacitances of the green and blue storage capacitors of the N-th horizontal line are substantially the same as each other, the capacitances of the green and blue storage capacitors of the (N+1)-th horizontal line are substantially the same as each other, and the capacitance of each of the green and blue storage capacitors of the N-th horizontal line is greater than the capacitance of each of the green and blue storage capacitors of the (N+1)-th horizontal line.

In some embodiments, the sum of the capacitances of the red, green, and blue storage capacitors of the N-th horizontal line is substantially the same as the sum of the capacitances of the green, blue, and red storage capacitors of the (N+1)-th horizontal line.

In some embodiments, the area of a storage electrode formed in a red sub-pixel of the (N+1)-th horizontal line is larger than the area of the storage electrode formed in a red sub-pixel of the N-th horizontal line.

In some embodiments, the area of each of storage electrodes formed in the green and blue sub-pixels of the N-th horizontal line is larger than the area of the storage electrode formed in the red sub-pixel of the N-th horizontal line, and the area of the storage electrode formed in the red sub-pixel of the (N+1)-th horizontal line is larger than the area of each of storage electrodes formed in the green and blue sub-pixels of the (N+1)-th horizontal line.

In some embodiments, the area of each of the storage electrodes formed in the green and blue sub-pixels of the N-th horizontal line is larger than the area of each of the storage electrodes formed in the green and blue sub-pixels of the (N+1)-th horizontal line.

In some embodiments, the sum of the areas of the storage electrodes formed in the red, green, and blue sub-pixels of the N-th horizontal line is substantially the same as the sum of the areas of the storage electrodes formed in the red, green, and blue sub-pixels of the (N+1)-th horizontal line, and the thickness of the passivation layer formed between the storage electrode of the red sub-pixel of the (N+1)-th horizontal line and the pixel electrode is thinner than the thickness of the passivation layer formed between the storage electrode of the red sub-pixel of the N-th horizontal line and the pixel electrode.

In some embodiments, the thickness of a passivation layer formed between the storage electrode of each of the blue and green sub-pixels of the N-th horizontal line and the pixel electrode is thinner than the thickness of the passivation layer formed between the storage electrode of the red sub-pixel of the N-th horizontal line and the pixel electrode, and the thickness of the passivation layer formed between the storage electrode of the red sub-pixel of the (N+1)-th horizontal line and the pixel electrode is thinner than the thickness of the passivation layer formed between the storage electrode of each of the green and blue sub-pixels of the (N+1)-th horizontal line and the pixel electrode.

In some embodiments, the thickness of the passivation layer formed between the storage electrode of the green sub-pixel of the N-th horizontal line and the pixel electrode is substantially the same as the thickness of the passivation layer formed between the storage electrode of the blue sub-pixel of the N-th horizontal line and the pixel electrode, the thickness of a passivation layer formed between the storage electrode of the green sub-pixel of the (N+1)-th horizontal line and the pixel electrode is substantially the same as the thickness of the passivation layer formed between the storage electrode of the blue sub-pixel of the (N+1)-th horizontal line and the pixel electrode, the thickness of the passivation layer formed between the storage electrode of each of the green and blue sub-pixels of the N-th horizontal line and the pixel electrode is thinner than the thickness of the passivation layer formed between the storage electrode of each of the green and blue sub-pixels of the (N+1)-th horizontal line and the pixel electrode.

In some embodiments, the liquid crystal display devices further comprises a gate driver supplying a scan signal to the gate lines, and a data driver supplying a pixel data signal to the data lines and having one output line connected to a plurality of data lines.

In some embodiments, the liquid crystal display device further comprises a plurality of transistors connected between the one output line of the data driver and the plurality of data lines to sequentially turn on the data lines.

In accordance with another exemplary embodiment of the present invention, a method of manufacturing a liquid crystal display device includes forming gate lines along horizontal lines in sub-pixels arranged repeatedly in order of red, green, and blue along an N-th (where N is a natural number) horizontal line, and in sub-pixels formed in a staggered structure with the N-th horizontal line and arranged repeatedly in order of green, blue, and red along an (N+1)-th horizontal line; forming data lines which cross the gate lines with a gate insulating layer disposed therebetween and is bent along the sub-pixels of the staggered structure; forming thin film transistors connected to the gate lines and to the data lines; forming pixel electrodes connected to the thin film transistors; and forming storage electrodes overlapping the pixel electrodes with the gate insulating layer and a passivation layer disposed therebetween to form red, green, and blue storage capacitors, wherein the capacitance of a red storage capacitor of the (N+1)-th horizontal line is greater than the capacitance of a red storage capacitor of the N-th horizontal line.

In some embodiments, the area of a storage electrode formed in a red sub-pixel of the (N+1)-th horizontal line is larger than the area of a storage electrode formed in a red sub-pixel of the N-th horizontal line.

In some embodiments, the area of a storage electrode formed in a green sub-pixel of the N-th horizontal line is substantially the same as the area of a storage electrode formed in a blue sub-pixel of the N-th horizontal line, the area of a storage electrode formed in a green sub-pixel of the (N+1)-th horizontal line is substantially the same as the area of a storage electrode formed in a blue sub-pixel of the (N+1)-th horizontal line, the area of each of the storage electrodes formed in the green and blue sub-pixels of the N-th horizontal line is larger than the area of each of the storage electrodes formed in the green and blue sub-pixels of the (N+1)-th horizontal line, the capacitance of each of the storage electrodes formed in the green and blue sub-pixels of the N-th and (N+1)-th horizontal lines is greater than the capacitance of the storage electrode formed in the red sub-pixel of the N-th horizontal line and less than the capacitance of the storage electrode formed in the red sub-pixel of the (N+1)-th horizontal line.

In some embodiments, the storage electrodes are formed to have the same area, and the passivation layer overlapping the storage electrodes formed in the red, green, and blue sub-pixels of the N-th and (N+1)-th horizontal lines is formed to have different thickness.

In some embodiments, the thickness of a passivation layer overlapping the storage electrode formed in the red sub-pixel of the (N+1)-th horizontal line is thinner than the thickness of a passivation layer overlapping the storage electrode formed in the red sub-pixel of the N-th horizontal line.

In some embodiments, the passivation layer overlapping the storage electrodes formed in the green and blue sub-pixels of the (N+1)-th horizontal line has the same thickness, the thickness of the passivation layer overlapping each of the storage electrodes formed in the green and blue sub-pixels of the (N+1)-th horizontal line is thinner than the thickness of the passivation layer overlapping the storage electrode formed in the red sub-pixel of the N-th horizontal line and thicker than the thickness of the passivation layer overlapping the storage electrode formed in the red sub-pixel of the (N+1)-th horizontal line, the passivation layer overlapping the storage electrodes formed in the green and blue sub-pixels of the N-th horizontal line has the same thickness, the thickness of the passivation layer overlapping each of the storage electrodes formed in the green and blue sub-pixels of the N-th horizontal line is thinner than the thickness of the passivation layer overlapping the storage electrode formed in the red sub-pixel of the N-th horizontal line and thicker than the thickness of the passivation layer overlapping the storage electrode formed in the red sub-pixel of the (N+1)-th horizontal line.

In some embodiments, the method of manufacturing a liquid crystal display device further comprises; forming a photoresist layer on the passivation layer; patterning the photoresist layer by a mask having a first slit region corresponding to the storage electrodes formed in the green and blue sub-pixels of the N-th horizontal line, a second slit region corresponding to the storage electrodes formed in the green and blue sub-pixels of the (N+1)-th horizontal line, and a third slit region corresponding to the storage electrode formed in the red sub-pixel of the (N+1)-th horizontal line; and etching the passivation layer by the photoresist layer; wherein sizes of the first to third slit regions are substantially the same as each other, the number of slits of the first slit region is smaller than the number of slits of the second slit region and the number of slits of the third slit region is smaller than the number of slits of the first slit region, and distances between the slits of the first to third slit regions are identical.

In accordance with further another exemplary embodiment of the present invention, a liquid crystal display device includes: sub-pixels arranged repeatedly in order of red, green, and blue along an N-th (where N is a natural number) horizontal line, and sub-pixels formed in a staggered structure with the N-th horizontal line and arranged repeatedly in order of green, blue, and red along an (N+1)-th horizontal line; gate lines formed along the horizontal lines; data lines formed to cross the gate lines with a gate insulating layer disposed therebetween and formed to be bent along the sub-pixels of the staggered structure; thin film transistors connected to the gate lines and to the data lines; pixel electrodes connected to the thin film transistors; and storage electrodes overlapping the pixel electrodes with the gate insulating layer and a passivation layer disposed therebetween to form red, green, and blue storage capacitors; wherein the capacitances of the red, green, and blue storage capacitors of the N-th horizontal line are respectively different from the capacitances of the red, green, and blue storage capacitors of the (N+1)-th horizontal lines.

BRIEF DESCRIPTION OF THE DRAWINGS

The above and other features and advantages of the present invention will become more apparent by describing exemplary embodiments thereof with reference to the accompanying drawings, in which:

FIG. 6 is a view showing rates of storage capacitors in a color arrangement of the TFT substrate of FIG. 4;

FIGS. 7A to 7E are cross-sectional views showing a process for manufacturing a TFT substrate in accordance with a first exemplary embodiment of the present invention;

FIGS. 11A to 11H are cross-sectional views showing a process for manufacturing a TFT substrate in accordance with a second exemplary embodiment of the present invention.

DETAILED DESCRIPTION OF THE INVENTION

Hereinafter, exemplary embodiments of the present invention will now be described in detail with reference to FIGS. 1 to 11H.

Figure 1:
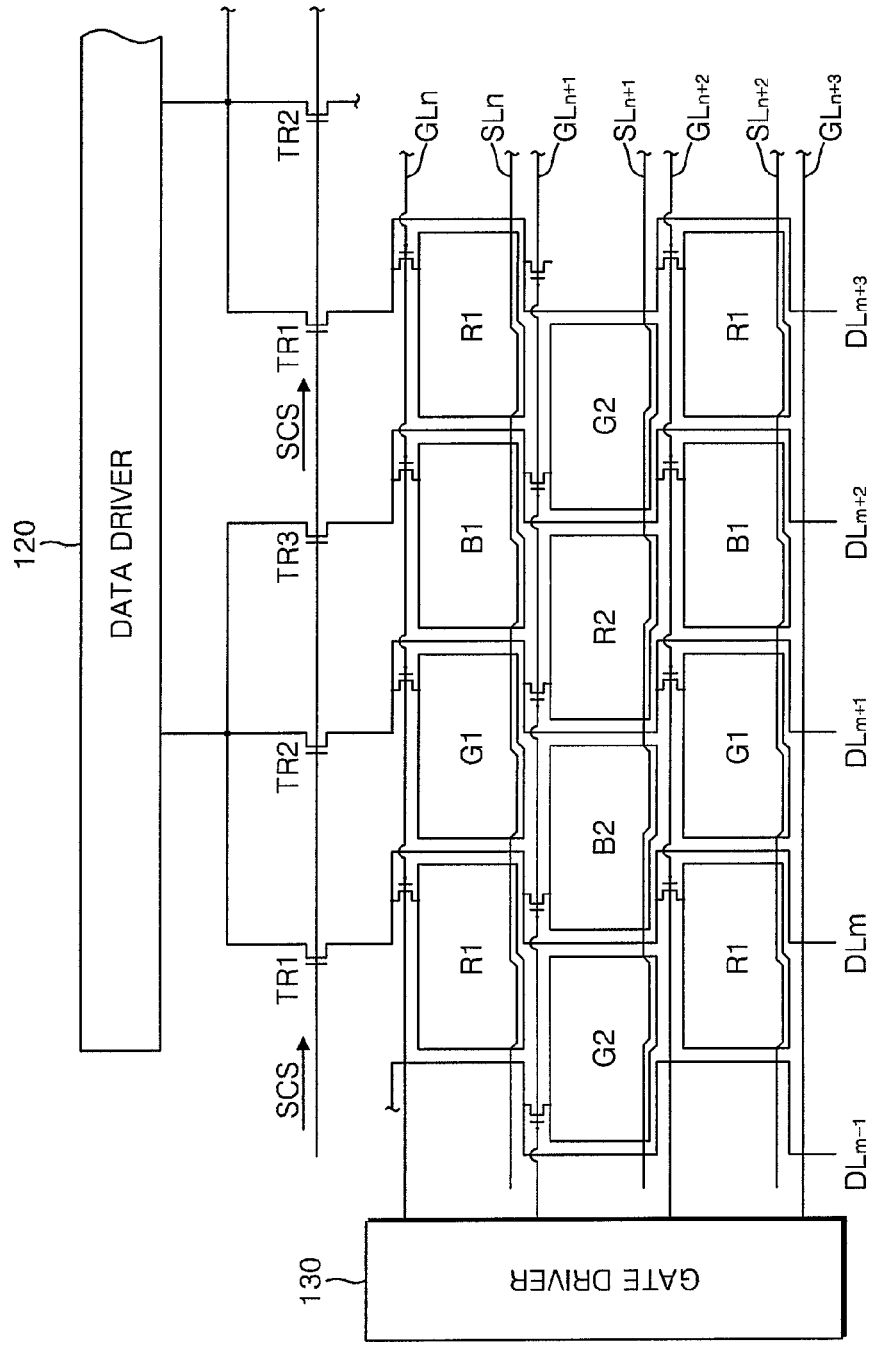
FIG. 1 is a plan view showing an LCD device in accordance with an exemplary embodiment of the present invention.

Referring to FIG. 1, an LCD device in accordance with an exemplary embodiment of the present invention includes an LCD panel, a gate driver 130 for supplying a scan signal to the LCD panel, a data driver 120 for supplying a pixel data signal to the LCD panel, and a backlight unit (not shown) for supplying light to the LCD panel.

The backlight unit includes a light source, such as a lamp or a light emitting diode, for generating light, a light guide plate for guiding the light supplied from the light source to the LCD panel, a plurality of optical sheets including a reflection sheet, a diffusion sheet, and a prism sheet to improve the efficiency of the light supplied from the light guide plate. The reflection sheet is located under the light guide plate and reflects the light supplied to the lower side of the light guide plate towards the light guide plate, thereby improving the efficiency of light use.

The gate driver 130 sequentially supplies a scan signal to gate lines GL1 to GLn to drive the gate lines GL1 to GLn. The gate driver 130 may be integrated on a TFT substrate as an amorphous silicon gate ("ASG") form or may be mounted on the TFT substrate as a chip-on-glass ("COG") form.

Figure 2:
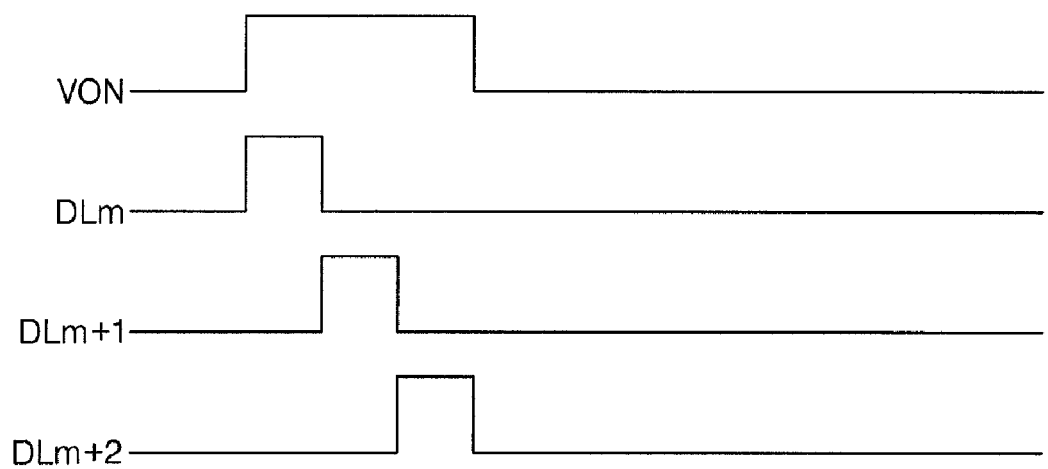
FIG. 2 is a waveform chart showing data charged to sub-pixels with respect to a scan signal when the LCD device of FIG. 1 is driven.

The data driver 120 supplies a pixel data signal to data lines DL1 to DLm whenever the scan signal is supplied to the gate lines GL1 to GLn. One output node of the data driver 120 is divided into three nodes connected to three data lines with three transistors TR1 to TR3 disposed therebetween. First to third transistors TR1 to TR3 are sequentially turned on by a control signal SCS supplied from a controller (not shown). As shown in FIG. 2, the first to third transistors TR1 to TR3 are sequentially turned on at a period of one third of the scan signal when the scan signal is supplied to the gate lines. Accordingly, the pixel data signal is sequentially supplied to the m-th data line DLm, the (m+1)-th data line DLm+1, and the (m+2)-th data line DLm+2. The first to third transistors TR1 to TR3 may be integrally formed on the TFT substrate.

The data driver 120 may be integrated on the TFT substrate or may be mounted as a COG form. Alternatively, the data driver 120 is attached to a circuit board and the LCD panel as a data carrier package form.

The LCD panel includes a TFT substrate where a TFT array is formed, a color filter substrate where a color filter array is formed, and a liquid crystal layer disposed between the TFT substrate and the color filter substrate.

The liquid crystal layer is formed of liquid crystal molecules having dielectric anisotropy. The liquid crystal molecules are twisted by a vertical electric field caused by a voltage difference between a pixel electrode 100 formed on the TFT substrate and a common electrode formed on the color filter substrate, thereby varying the transmittance of light incident from the backlight unit (not shown).

The color filter substrate includes a black matrix corresponding to the TFT, the gate lines, and the data lines and preventing light leakage, a color filter corresponding to the pixel electrode formed on the TFT substrate in a region divided by the black matrix and displaying colors, and a common electrode formed on the black matrix and the floor filter.

The TFT substrate is formed such that the TFT array is formed on a substrate 10.

Hereinafter, the TFT substrate will be described in detail with reference to FIGS. 3 to 11H.

Figure 3:
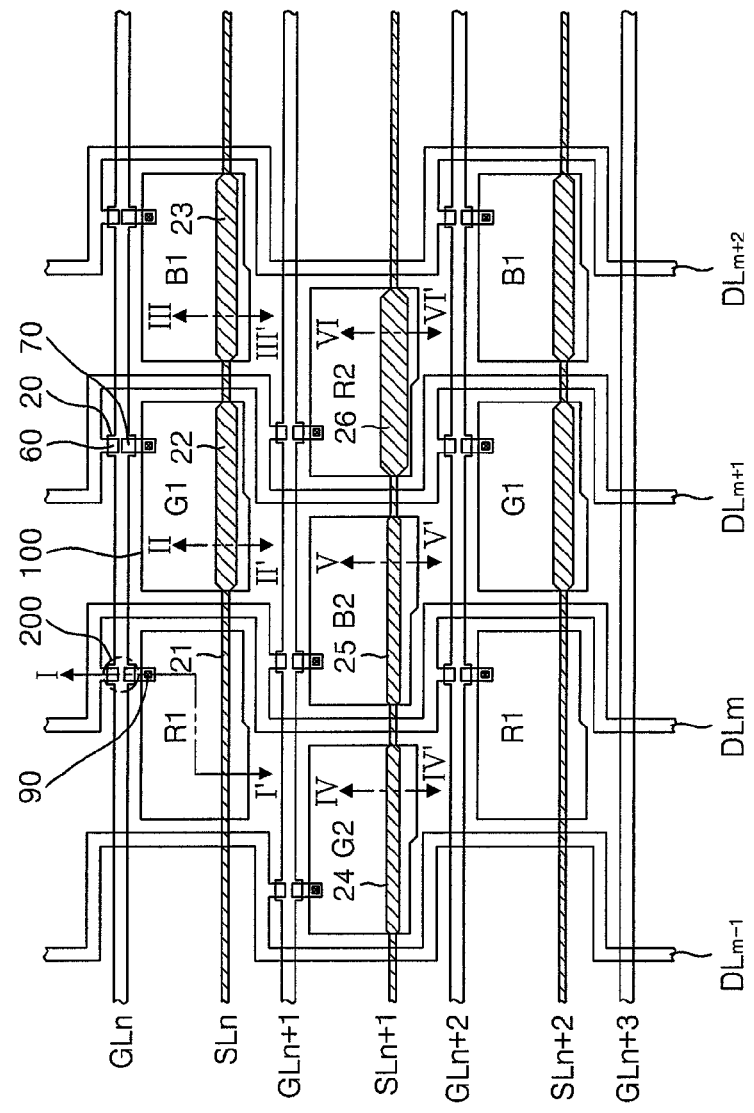
FIG. 3 is a plan view showing a TFT substrate in accordance with a first exemplary embodiment of the present invention.
Figure 4:
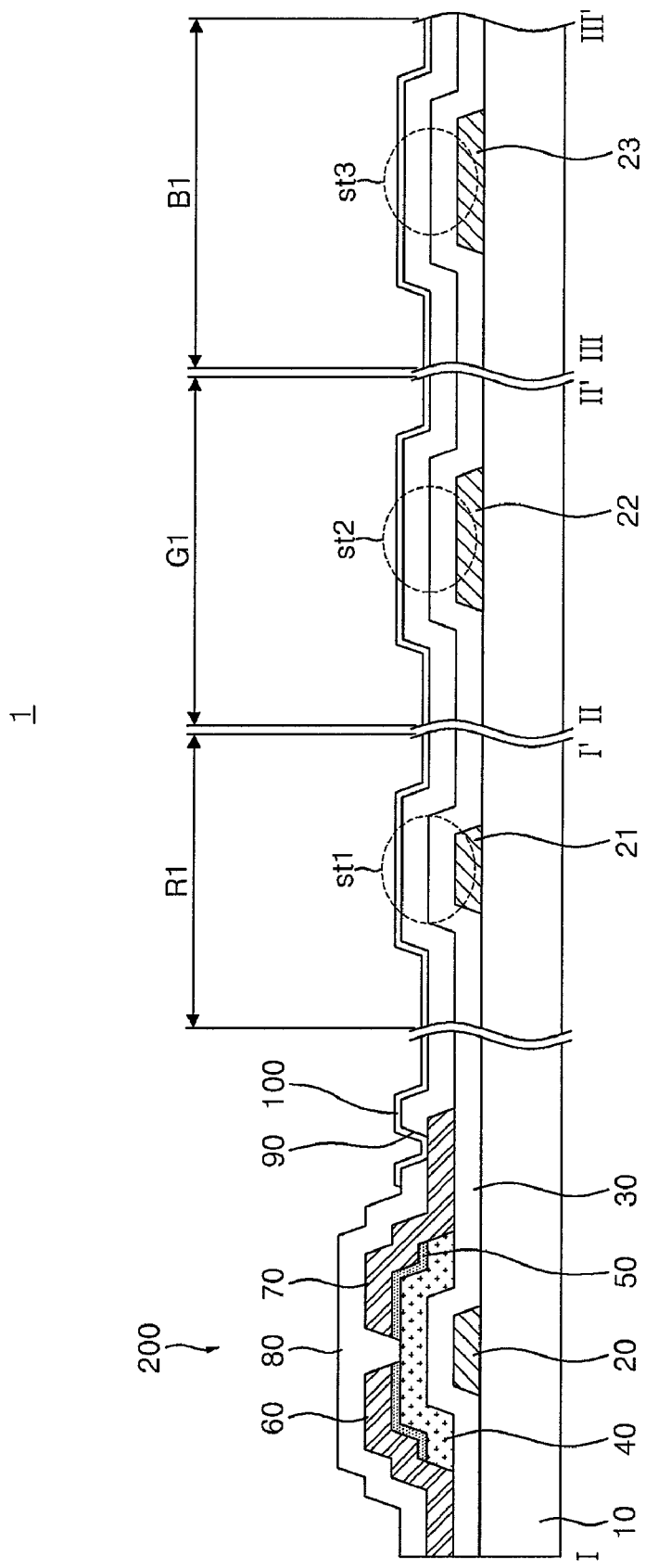
FIG. 4 is a cross-sectional view taken along lines I-I', II-II' and III-III' of the TFT substrate of FIG. 3.
Figure 5:
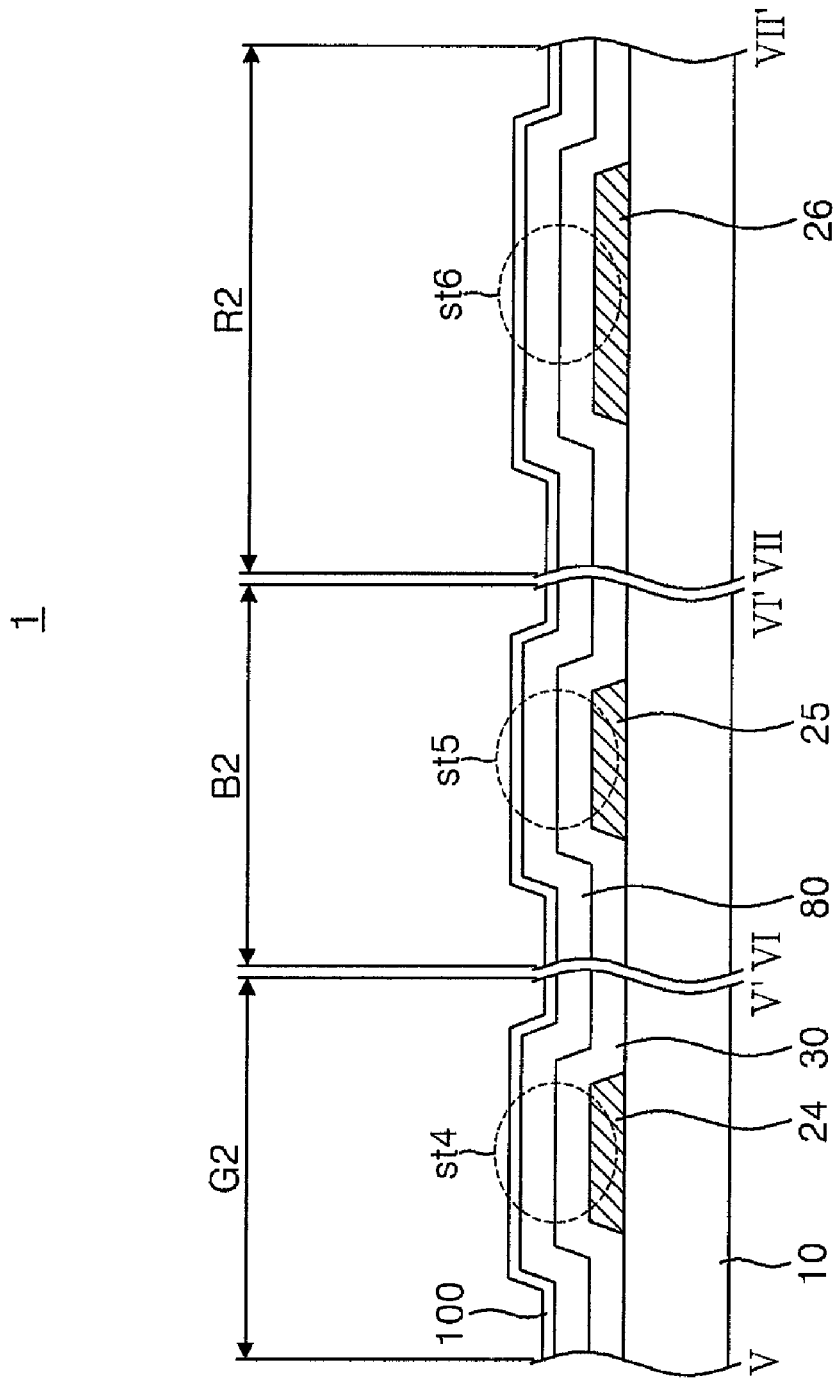
FIG. 5 is a cross-sectional view taken along lines V-V', VI-VI' and VII-VII' of the TFT substrate of FIG. 3.

FIG. 3 is a plan view showing a TFT substrate 1 in accordance with a first exemplary embodiment of the present invention, FIG. 4 is a cross-sectional view taken along lines I-I', II-II' and III-III' of the TFT substrate of FIG. 3, and FIG. 5 is a cross-sectional view taken along lines V-V', VI-VI' and VII-VII' of the TFT substrate of FIG. 3.

Referring to FIGS. 3 to 5, sub-pixels are repeatedly arranged in order of red R1, green G1, and blue B1 along the N-th (where N is a natural number) horizontal line supplying the scan signal and in order of green G2, blue B2, and red R2 along the (N+1)-th horizontal line. The sub-pixels in the N-th horizontal line have a staggered arrangement with the sub-pixels in the (N+1)-th horizontal line. Gate lines GL1 to GLn are formed along the horizontal lines. Data lines DL1 to DLm cross the gate lines GL1 to GLn with a gate insulating layer 30 disposed therebetween and are formed to be bent along the staggered sub-pixels. A TFT 200 is connected to each of the gate lines GL1 to GLn and the data lines DL1 to DLm. A pixel electrode 100 is connected to the TFT 200 and formed in each sub-pixel. Each of storage electrodes 21 to 26 forms a storage capacitor by overlapping the pixel electrode 100 in each sub-pixel region with a passivation layer 80 disposed therebetween. The capacitance Cst6 of a red storage capacitor st6 of the (N+1)-th horizontal line is greater than the capacitance Cst1 of a red storage capacitor st1 of the N-th horizontal line.

The first horizontal line in which sub-pixels are sequentially formed in order of red R1, green G1, and blue B1 and the second horizontal line in which sub-pixels are sequentially formed in order of green G2, blue B2, and red R2 are repeatedly formed. Therefore, sub-pixels constituting one pixel are arranged in a delta shape.

The TFT 200 includes a gate electrode connected to the gate line, a source electrode 60 connected to the data line, a drain electrode 70 connected to the pixel electrode 100, a semiconductor layer 40 for forming a channel between the source electrode 60 and the drain electrode 70 while overlapping the gate electrode 20 with a gate insulating layer 30 disposed therebetween, and an ohmic contact layer 50 for providing ohmic contact between the semiconductor layer 40 and the source and drain electrodes 60 and 70. The TFT 200 supplies a pixel data signal of the data line to the pixel electrode 100 in response to a scan signal of the gate line.

The pixel electrode 100 is formed on a passivation layer 80 covering the TFT 200 and connected to the drain electrode 70 via a pixel contact hole 90 by penetrating the passivation layer 80. When the pixel data signal is supplied from the TFT 200, the pixel electrode 100 drives the liquid crystal by using the voltage difference with the common electrode of the color filer substrate, thereby varying the light transmittance.

The gate lines GL1 to GLn are formed in a horizontal direction and supply the scan signal to the gate electrode 20 of the TFT 200.

The data lines DL1 to DLm cross the gate lines GL1 to GLn and are formed to be bent in a vertical direction. The data lines DL1 to DLm supply the pixel data signal to the source electrode 60 of the TFT 200. The data lines DL1 to DLm are bent along the periphery of the pixel electrode 100.

The gate lines GL1 to GLn and the data lines DL1 to DLm cross each other with the gate insulating layer 30 disposed therebetween and define sub-pixel regions of a delta shape.

First to sixth storage capacitors st1 to st6 are formed such that first to sixth storage electrodes 21 to 26 connected to storage lines SL1 to SLn formed in parallel with the gate lines GL1 to GLn overlap the pixel electrode 100, with the gate insulating layer 30 and the passivation layer 80 disposed therebetween. The area of the second storage electrode 22 formed in a G1 sub-pixel region of the first horizontal line is substantially the same as the area of the third storage electrode 23 formed in a B1 sub-pixel region of the first horizontal line. The area of the first storage electrode 21 formed in an R1 sub-pixel region of the first horizontal line is smaller than the area of each of the second and third storage electrodes 22 and 23. The area of the fourth storage electrode 24 formed in a G2 sub-pixel region of the second horizontal line is substantially the same as the area of the fifth storage electrode 25 formed in a B2 sub-pixel region of the second horizontal line. The area of the sixth storage electrode 26 formed in an R2 sub-pixel region of the second horizontal line is larger than the area of each of the fourth and fifth storage electrodes 24 and 25.

The ratio of the area of a storage electrode of the TFT substrate according to the first exemplary embodiment of the present invention will now be explained by way of example of Equation (1).

$$Cst = \varepsilon \frac{A}{d}, \quad (1)$$

where Cst is the capacitance of the storage capacitor, A is the area of the storage electrode, d is the distance between two electrodes of the storage capacitor, and $\in$ is the dielectric constant of the dielectric material formed between the two electrodes of the storage capacitor. Since the dielectric constant $\in$ designates a unique characteristic of material, it is a fixed constant depending on the dielectric constant of each of the gate insulating layer 30 and the passivation layer 80 serving as a dielectric material.

Therefore, the capacitance Cst of the storage capacitor is determined according to the area of the storage electrode or the distance between two electrodes of the storage capacitor. Assuming that the area of the sixth storage electrode 26 is three times larger than the area of the first storage electrode 21, the capacitance Cst6 of the sixth storage capacitor st6 is three times the capacitance Cst1 of the first storage capacitor st1. Namely, the first storage electrode 21 formed in the R1 sub-pixel region of the first horizontal line and the sixth storage electrode 26 formed in the R2 sub-pixel region of the second horizontal line have different areas. Preferably, the area of the sixth storage electrode 26 is three times larger than the area of the first storage electrode 21. Also, the second storage electrode 22 formed in the G1 sub-pixel region of the first horizontal line and the fourth storage electrode 24 formed in the G2 sub-pixel region of the second horizontal line have different areas. The third storage electrode 23 formed in the B1 sub-pixel region of the first horizontal line and the fifth storage electrode 25 formed in the B2 sub-pixel region of the second horizontal line have different areas.

Although the charging time of the pixel data signal of the R2 sub-pixel region of the second horizontal line is shorter than the charging time of the pixel data signal of the R1 sub-pixel region of the first horizontal line, since the capacitance Cst1 of the sixth storage capacitor st6 is three times the capacitance Cst1 of the first storage capacitor st1, the charging rate is compensated for and a vertical line defect is prevented.

As shown in FIG. 6, the sum of capacitances Cst1 to Cst3 of the first to third storage capacitors st1 to st3 of the R1, G1, and B1 sub-pixel regions of the first horizontal line should be the same as the sum of capacitances Cst4 to Cst6 of the fourth to sixth storage capacitors st4 to st6 of the G2, B2, and R2 sub-pixel regions of the second horizontal line. Accordingly, each of the capacitances Cst2 and Cst3 of the second and third storage capacitors st2 and st3 is 2.5 times the capacitance Cst1 of the first storage capacitor st1, and each of the capacitances Cst4 and Cst5 of the fourth and fifth storage capacitors st4 and st5 is 1.5 times the capacitance Cst1 of the first storage capacitor st1.

FIGS. 7A to 7E are cross-sectional views showing a process for manufacturing the TFT substrate in accordance with a first exemplary embodiment of the present invention. Although FIGS. 7A to 7E illustrate a process for manufacturing the TFT substrate using 5 mask processes, it is possible to use 3 or 4 mask processes.

FIG. 7A illustrates a first mask process in a process for manufacturing the TFT substrate according to a first exemplary embodiment of the present invention.

Referring to FIG. 7A, a first conductive pattern group including gate lines GL1 to GLn, a gate electrode 20, storage lines SL1 to SLn, and first to sixth storage electrodes 21 to 26 is formed on a substrate 10 by the first mask process.

Specifically, a first conductive layer is formed on the substrate 10 of a transparent material such as organic material or plastic by a deposition method such as sputtering. The first conductive layer may be formed in a single layer structure composed of a metal such as aluminum (Al), chrome (Cr), copper (Cu), and molybdenum (Mo) or an alloy thereof or formed in a multi-layer structure composed of a combination of these metals.

The first conductive layer is patterned by a photolithography process using a first mask and an etching process, thereby forming the first conductive pattern group including the gate lines GL1 to GLn, the gate electrode 20, the storage lines SL1 to SLn, and the first to sixth storage electrodes 21 to 26. The first to third storage electrodes 21 to 23 are formed in the R1, G1, and B1 sub-pixel regions of the first horizontal line, and the third to sixth storage electrodes 23 to 26 are formed in G2, B2, and R2 sub-pixel regions of the second horizontal line.

The area of the sixth storage electrode 26 formed in the R2 sub-pixel region of the second horizontal line is formed to be larger than the area of the first storage electrode 21 formed in the R1 sub-pixel region of the first horizontal line. Preferably, the area of the sixth storage electrode 26 is three times the area of the first storage electrode 21. The area of each of the second and third storage electrodes 22 and 23 is formed to be larger than the area of the first storage electrode 21, preferably, by 1.5 times. Also, it is preferable that the area of each of the fourth and fifth storage electrodes 24 and 25 is 1.5 times the area of the first storage electrode 21.

The sum of the areas of the first to third storage electrodes 21 to 23 of the R1, G1, and B1 sub-pixel regions of the first horizontal line is substantially the same as the sum of the areas of the fourth to sixth storage electrodes 24 to 26 of the G2, B2, and R2 sub-pixel regions of the second horizontal line.

Figure 7B:
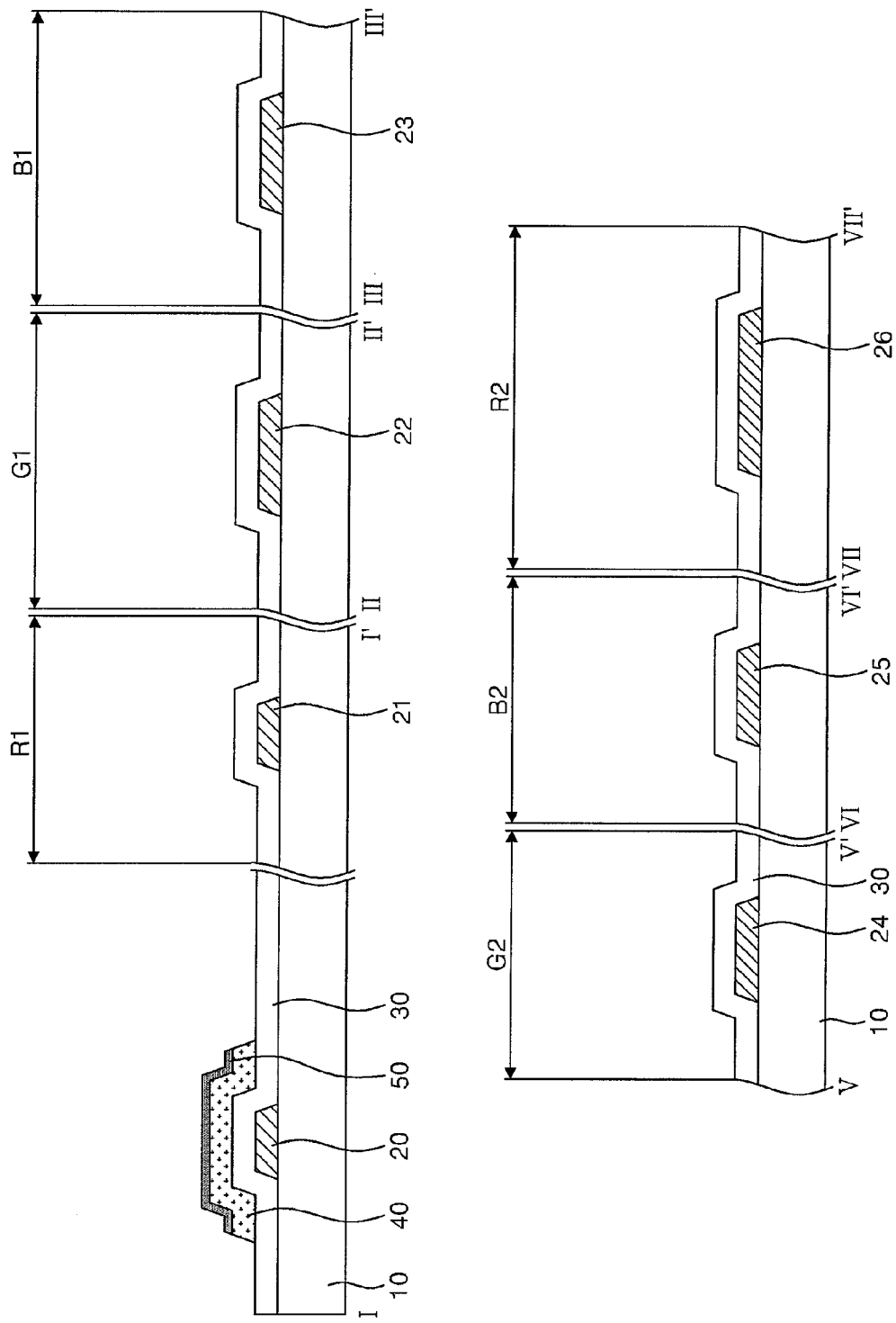

FIG. 7B illustrates a second mask process in a process for manufacturing the TFT substrate according to a first exemplary embodiment of the present invention.

Referring to FIG. 7B, a gate insulating layer 30, a semiconductor layer 40, and an ohmic contact layer 50 are sequentially formed by the second mask process on the substrate 10 on which the first conductive pattern group is formed.

Specifically, the gate insulating layer 30, an amorphous silicon layer, and an impurity-doped amorphous silicon layer are sequentially deposited by a deposition method such as plasma enhanced chemical vapor deposition (PECVD) or chemical vapor deposition (CVD) on the substrate 10 on which the gate lines GL1 to GLn, the gate electrode 20, the storage lines SL1 to SLn, and the first to sixth storage electrodes 21 to 26 are formed. The amorphous silicon layer and the impurity-doped amorphous silicon layer are patterned by a photolithography process using a second mask and an etching process, thereby forming the semiconductor layer 40 and the ohmic contact layer 50. An inorganic insulating material, such as nitride silicon (SiNx) or oxide silicon (SiOx), is used as the gate insulating layer 30. The semiconductor layer 40 may be formed by transforming the amorphous silicon layer into a poly silicon layer on a channel region by using a laser crystallization or solid phase crystallization method.

Figure 7C:
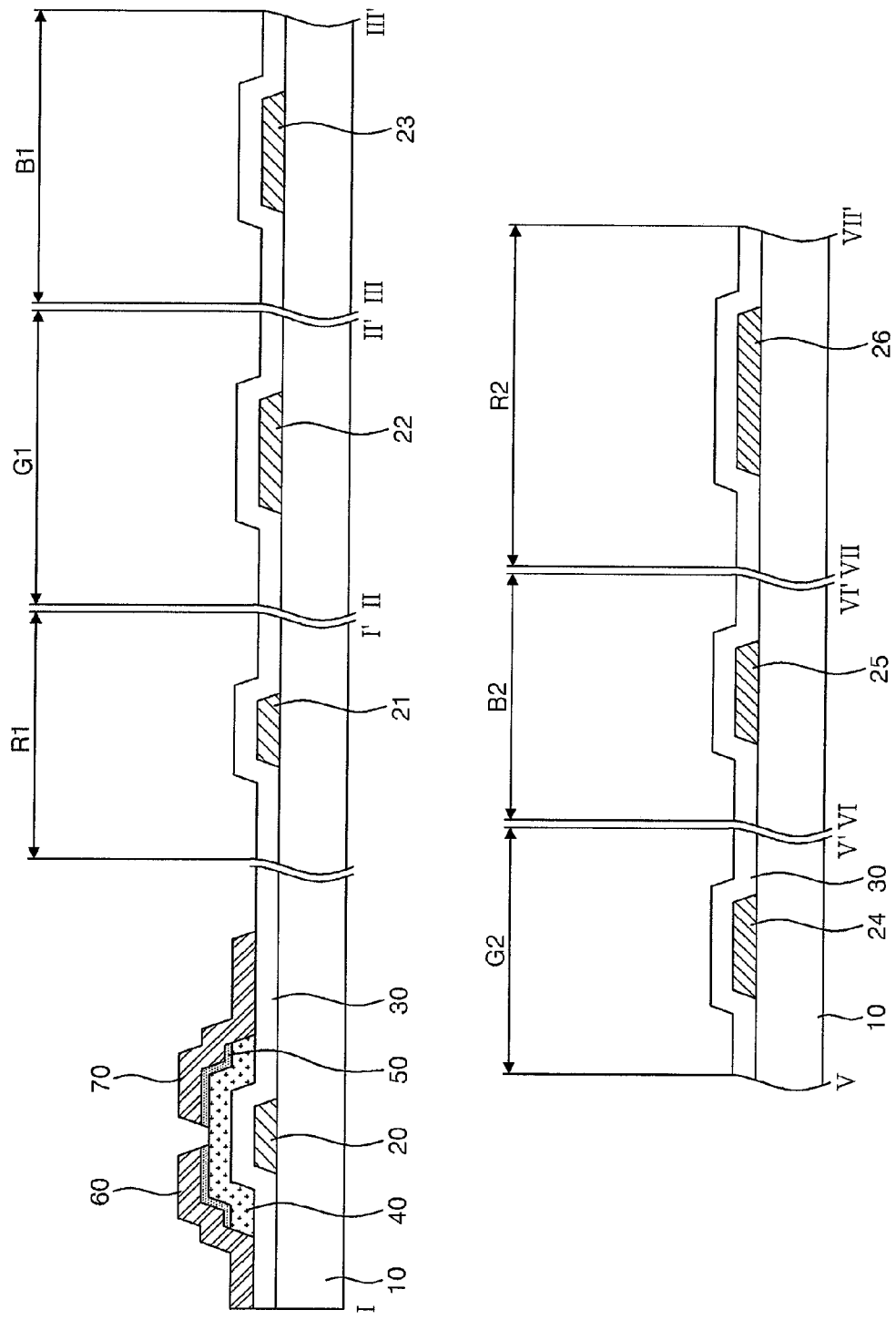

FIG. 7C illustrates a third mask process in a process for manufacturing the TFT substrate according to a first exemplary embodiment of the present invention.

Referring to FIG. 7C, a second conductive pattern group including a source electrode 60, a drain electrode 70, and data lines DL1 to DLm is formed by the third mask process on the substrate 10 on which the semiconductor layer 40, the ohmic contact layer 50, and the gate insulating layer 30 are formed.

Specifically, a second conductive layer is deposited by a deposition method such as sputtering on the substrate 10 on which the semiconductor layer 40, the ohmic contact layer 50, and the gate insulating layer 30 are formed. The second conductive pattern group is formed by patterning the second conductive layer by a photolithography process using a third mask and an etching process. The source electrode 60 and the drain electrode 70 on the ohmic contact layer 50 are formed to face each other. The data lines DL1 to DLm are formed to be connected to the source electrode 60. The second conductive layer is formed in a single layer structure composed of a metal such as Al, Cr, Cu, and Mo or an alloy thereof or formed in a multi-layer structure composed of a combination of these metals. The third mask may form a short channel by a slit mask or a semi-transmission mask in which slits are formed in a region where a channel is to be formed. The characteristics of a TFT may be improved by increasing the width of a channel and decreasing the length of the channel.

Figure 7D:
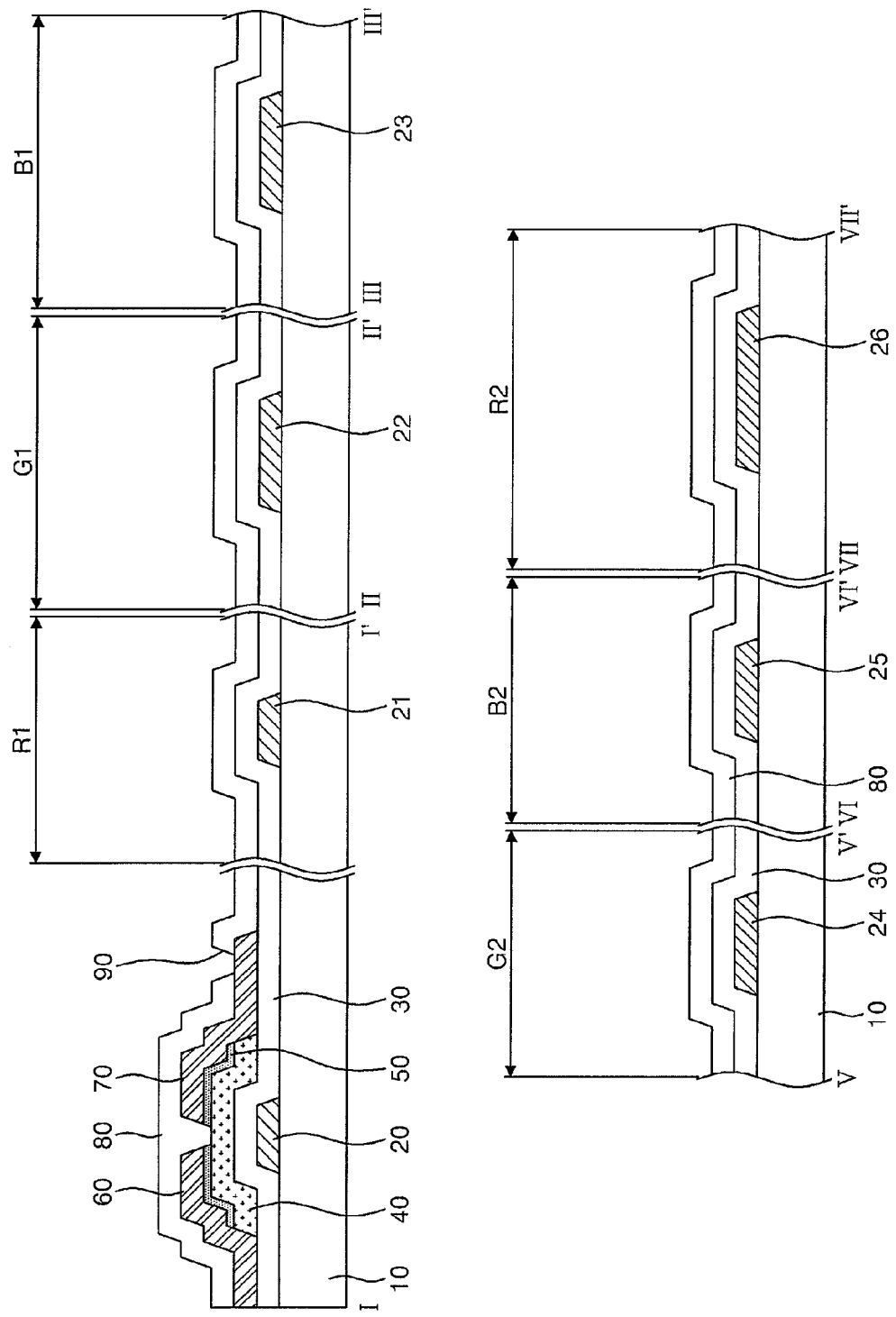

FIG. 7D illustrates a fourth mask process in a process for manufacturing the TFT substrate according to a first exemplary embodiment of the present invention.

Referring to FIG. 7D, a passivation layer 80 having a pixel contact hole 90 is formed by the fourth mask process on the gate insulating layer on which the second conductive pattern group is formed.

Specifically, the passivation layer 80 is formed by a deposition method such as PECVD or CVD on the substrate on which the second conductive pattern group is formed. The pixel contact hole 90 exposing the drain electrode 70 by penetrating the passivation layer 80 is formed by a photolithography process using a fourth mask and an etching process. An inorganic insulating material such as the gate insulating layer 30 or an organic insulating material is used as the passivation layer 80.

Figure 7E:
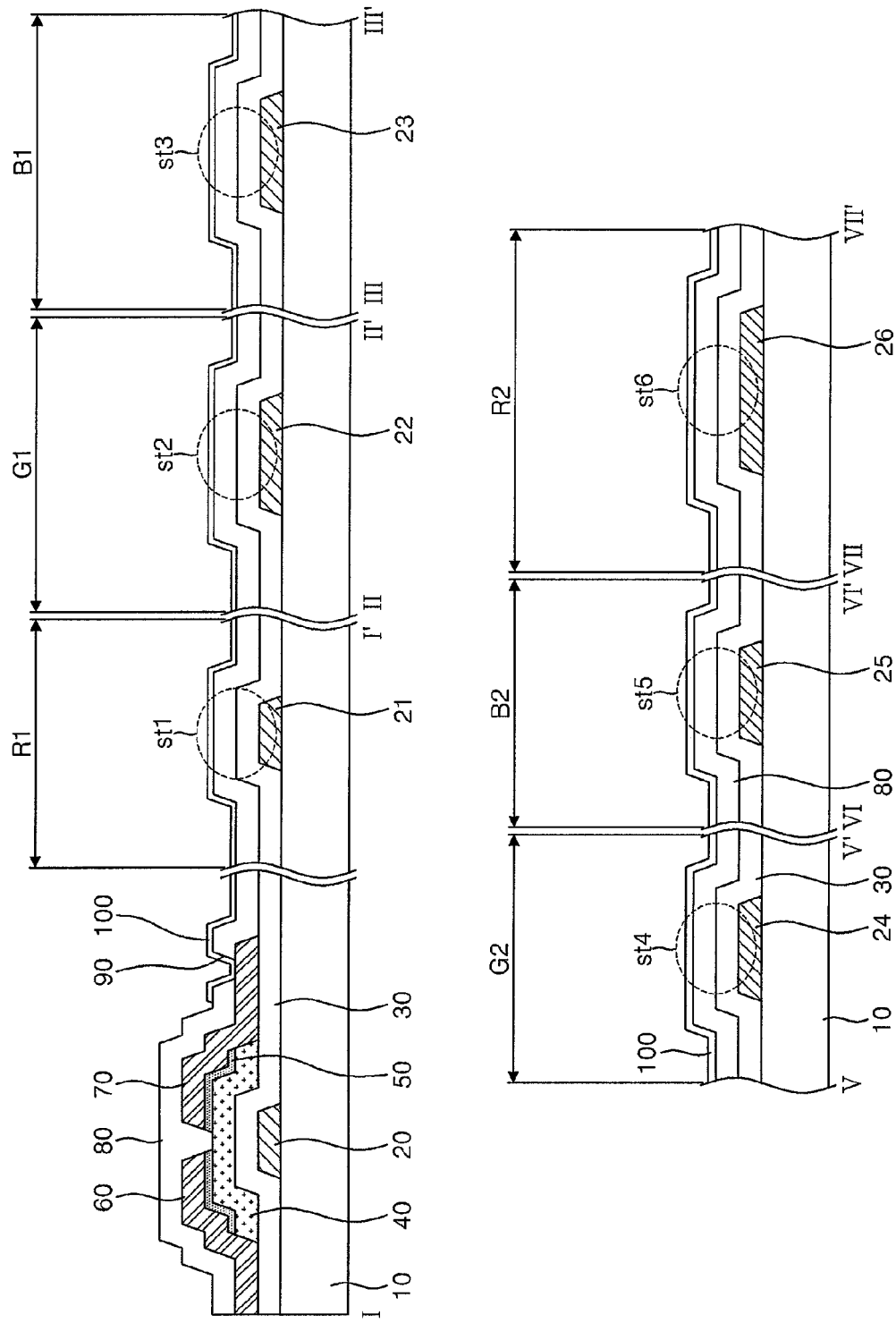

FIG. 7E illustrates a fifth mask process in a process for manufacturing the TFT substrate according to a first exemplary embodiment of the present invention.

Referring to FIG. 7E, a pixel electrode 100 is formed on the passivation layer 80 by the fifth mask process.

Specifically, a transparent conductive layer is formed on the passivation layer 80 by using a deposition method such as sputtering. Next, the transparent conductive layer is patterned by a photolithography process using a fifth mask and an etching process. The transparent conductive layer uses a transparent conductive material such as indium tin oxide (ITO), indium zinc oxide (IZO), tin oxide (TO), indium tin zinc oxide (ITZO). The pixel electrode 100 is connected to the drain electrode 70 through the pixel contact hole 90. The pixel electrode 100 is independently formed in a sub-pixel region. The pixel electrode 100 overlaps the first to sixth storage electrodes 21 to 26, thereby forming the first to sixth storage capacitors st1 to st6.

Figure 8:
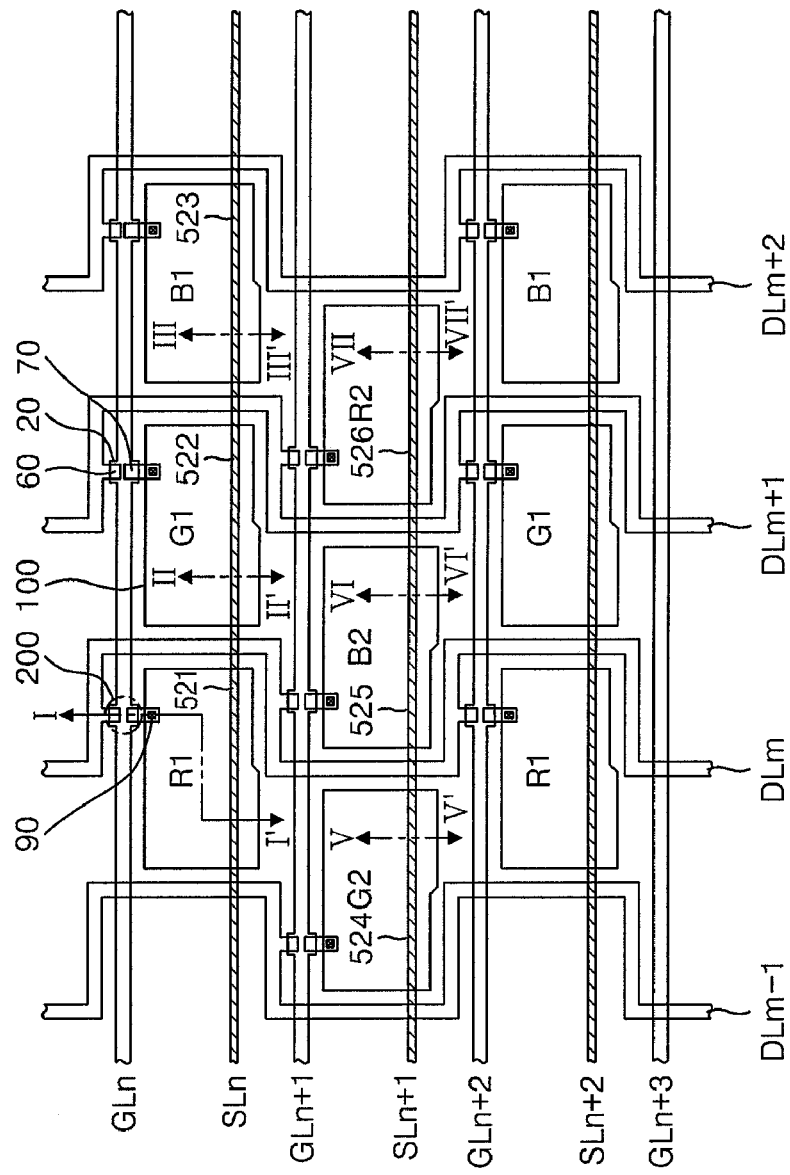
FIG. 8 a plan view showing a TFT substrate in accordance with a second exemplary embodiment of the present invention.
Figure 9:
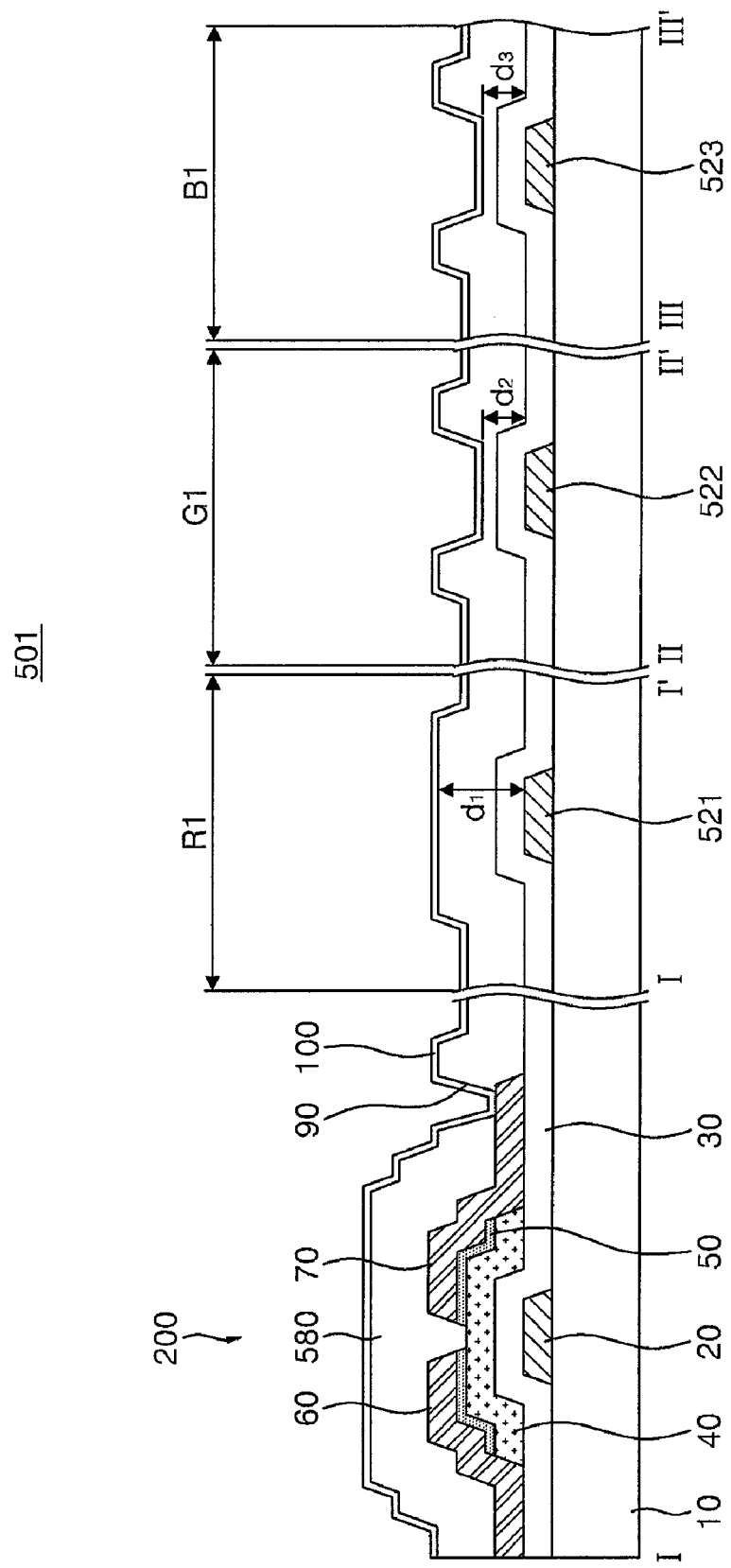
FIG. 9 is a cross-sectional view taken along lines I-I', II-II' and III-III' of the TFT substrate of FIG. 8.
Figure 10:
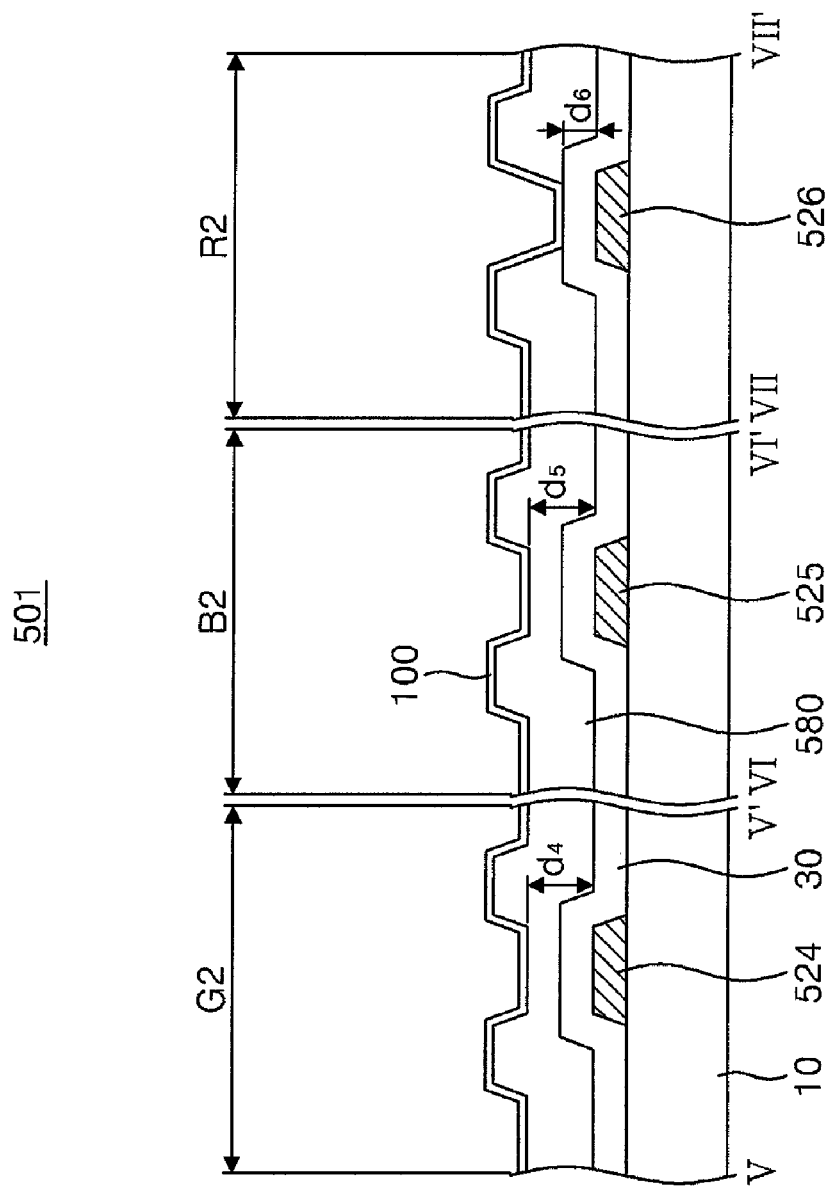
FIG. 10 is a cross-sectional view taken along lines V-V', VI-VI' and VII-VII' of the TFT substrate of FIG. 8.

FIG. 8 a plan view showing a TFT substrate in accordance with a second exemplary embodiment of the present invention, and FIGS. 9 and 10 are cross-sectional views taken along lines of the TFT substrate of FIG. 8.

The configurations of FIGS. 8 to 10 are the same as those of FIGS. 3 to 5, except that the areas of first to third storage electrodes 521 to 523 formed in the first horizontal line and fourth to sixth storage electrodes 524 to 526 formed in the second horizontal line are substantially the same as each other, the thickness of a passivation layer 580 between the first storage electrode 521 and the pixel electrode 100 is different from the thickness of the passivation layer 580 between the sixth storage electrode 526 and the pixel electrode 100, the thickness of the passivation layer 580 between the second storage electrode 522 and the pixel electrode 100 is different from the thickness of the passivation layer 580 between the fourth storage electrode 524 and the pixel electrode 100, the thickness of the passivation layer 580 between the third storage electrode 523 and the pixel electrode 100 is different from the thickness of the passivation layer 580 between the fifth storage electrode 525 and the pixel electrode 100, the thickness of the passivation layer 580 between the second storage electrode 522 is substantially the same as the thickness of the passivation layer 580 between the third storage electrode 523 and the pixel electrode 100, the thickness of the passivation layer 580 between the fourth storage electrode 524 and the pixel electrode 100 is substantially the same as the thickness of the passivation layer 580 between the fifth storage electrode 525 and the pixel electrode 100, Therefore, a detailed description of the repeated elements will be omitted and elements which are identical with elements of FIGS. 3 to 5 will be marked reference marks which are identical with FIGS. 3 to 5.

Referring to FIGS. 8 to 10, in order to make the capacitance Cst6 of the sixth storage capacitor st6 three times the capacitance Cst1 of the first storage capacitor st1, the distance between the sixth storage electrode 526 and the pixel electrode 100 is set to 1/3 times the distance between the first storage electrode 521 and the pixel electrode 100. Namely, the sum of the thicknesses of the gate insulating layer 30 and the passivation layer 580 formed between the sixth storage electrode 526 and the pixel electrode 100 is set to 1/3 times the sum of the thicknesses of the gate insulating layer 30 and the passivation layer formed between the first storage electrode 521 and the pixel electrode 100. To this end, the passivation layer 580 overlapping the sixth storage electrode 526 may be removed or a part of the gate insulating layer 30 formed under the passivation layer 580 may be removed. It is preferable that only the passivation layer 580 is removed so that the gate insulating layer 30 can insulate the sixth storage electrode 526 from the pixel electrode 100.

Since the capacitance Cst2 and Cst3 of each of the second and third storage capacitors st2 and st3 is 2.5 times the capacitance Cst1 of the first storage capacitor st1, the sum of the thicknesses of the passivation layer 580 and the gate insulating layer 30 formed between each of the second and third storage electrodes 522 and 523 and the pixel electrode 100 is set to 1/2.5 times the sum of the thicknesses of the passivation layer 580 and the gate insulating layer 30 formed between the first storage electrode 521 and the pixel electrode 100. Furthermore, since the capacitance Cst4 and Cst5 of each the fourth and fifth storage capacitors st4 and st5 is 1.5 times the capacitance Cst1 of the first storage capacitor st1, the sum of the thicknesses of the passivation layer 580 and the gate insulating layer 30 formed between each of the fourth and fifth storage electrodes 524 and 525 and the pixel electrode 100 is set to 1/1.5 times the sum of the thicknesses of the passivation layer 580 and the gate insulating layer 30 formed between the first storage electrode 521 and the pixel electrode 100. In this case, since the gate insulating layer 30 formed between the first to sixth storage electrodes 521 to 526 and the pixel electrode 100 should have a thickness capable of ensuring insulation between the first to sixth storage electrodes 521 to 526 and the pixel electrode 100, it is preferable to form the first to sixth storage capacitors st1 to st6 by varying only the thickness of the passivation layer 580.

FIGS. 11A to 11G are cross-sectional views showing a process for manufacturing the TFT substrate in accordance with a second exemplary embodiment of the present invention. FIGS. 7A to 7E illustrate a process for manufacturing the TFT substrate using 5 mask processes.

Figure 11A:
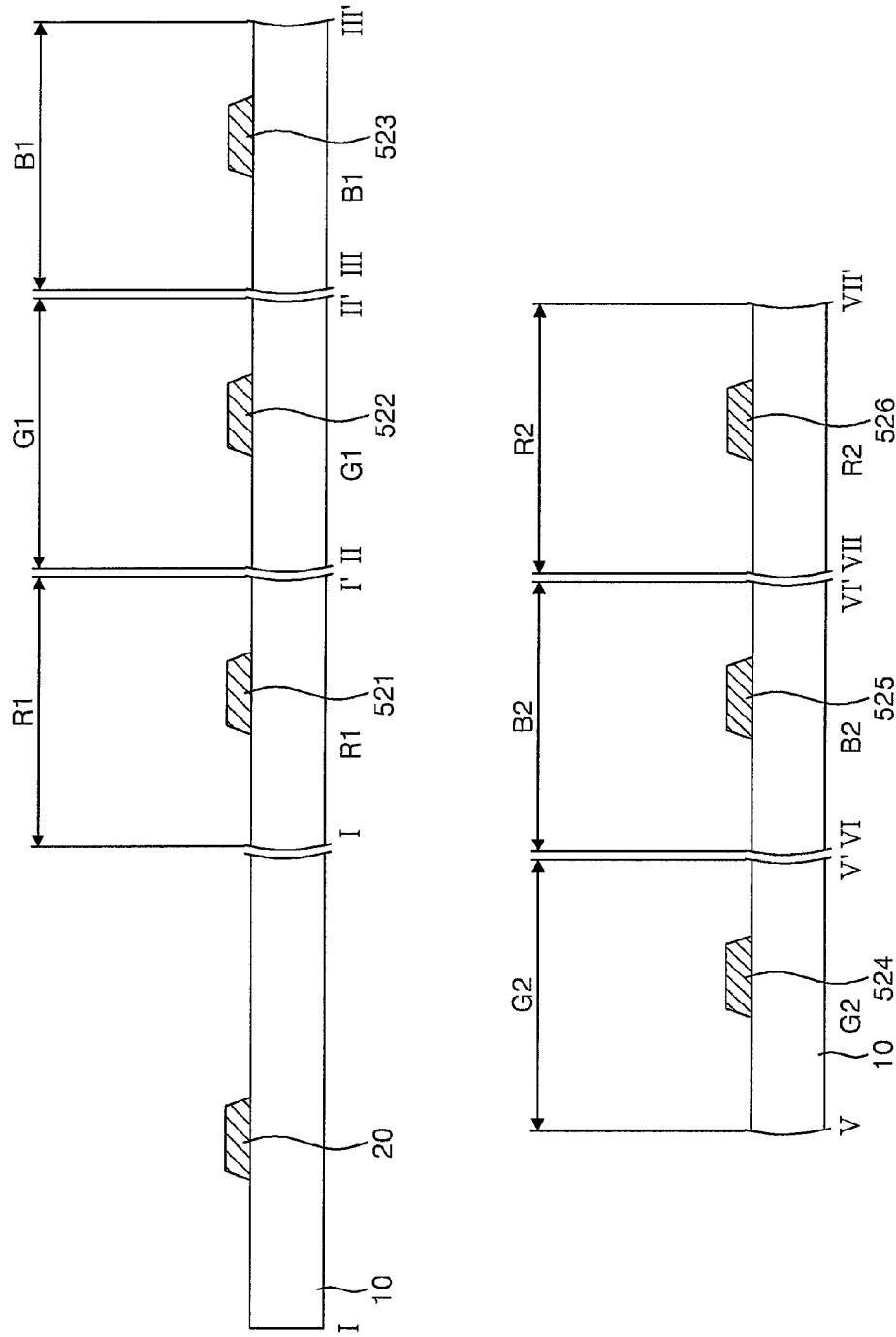

FIG. 11A illustrates a first mask process in a process for manufacturing the TFT substrate according to a second exemplary embodiment of the present invention.

Referring to FIG. 11A, a first conductive pattern group including gate lines GL1 to GLn, a gate electrode 20, storage lines SL1 to SLn, and first to sixth storage electrodes 521 to 526 is formed on a substrate 10 by the first mask process.

Specifically, a first conductive layer is formed on the substrate 10 of a transparent material such as an organic material or plastic by a deposition method such as sputtering. The first conductive layer may be formed in a single layer structure composed of a metal such as Al, Cr, Cu, and Mo or an alloy thereof or formed in a multi-layer structure composed of a combination of these metals. The first conductive layer is patterned by a photolithography process using a first mask and an etching process, thereby forming the first conductive pattern group including the gate lines GL1 to GLn, the gate electrode 20, the storage lines SL1 to SLn, and the first to sixth storage electrodes 521 to 526. The first to sixth storage electrodes 521 to 526 have the same areas.

Figure 11B:
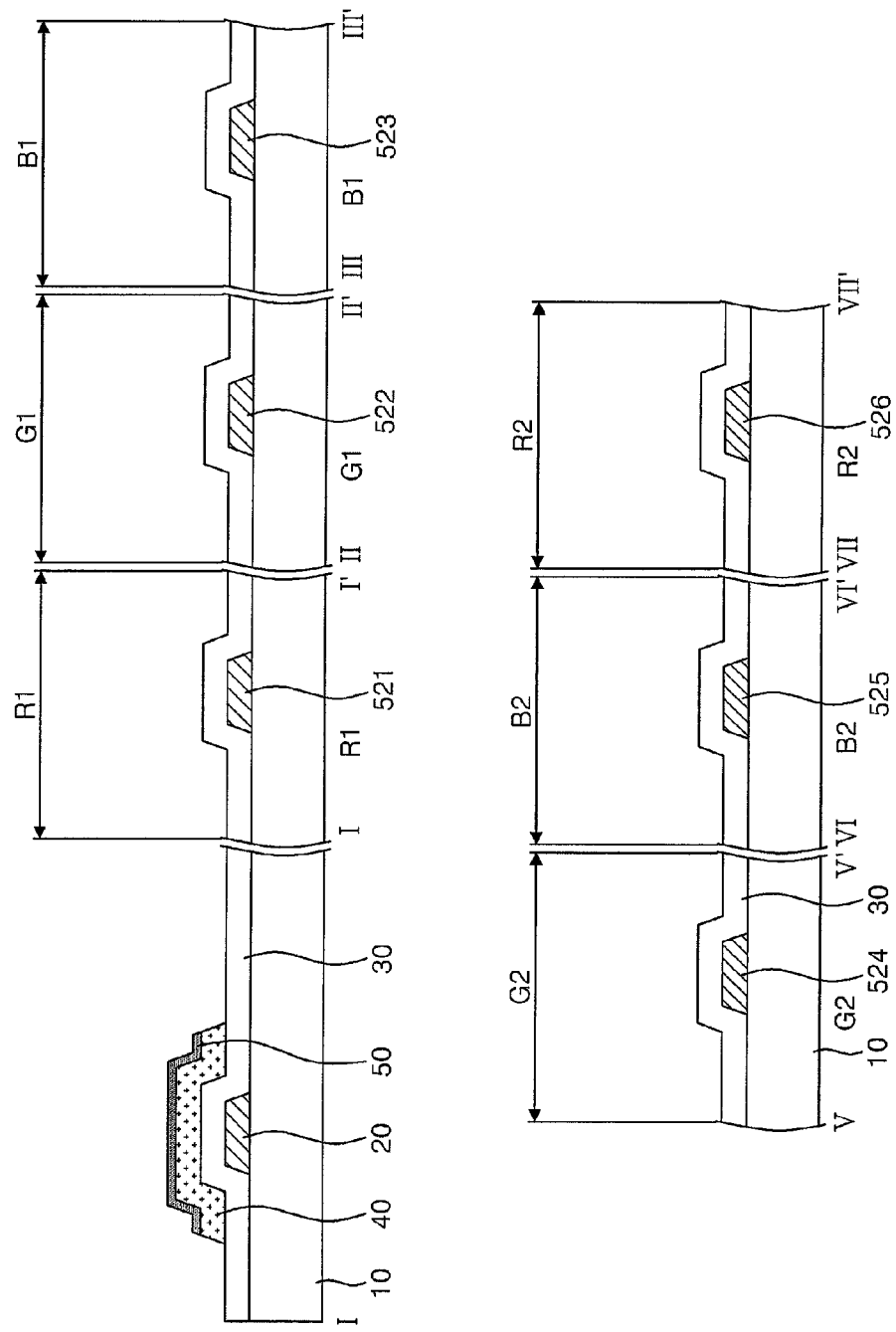

FIG. 11B illustrates a second mask process in a process for manufacturing the TFT substrate according to a second exemplary embodiment of the present invention.

Referring to FIG. 11B, a gate insulating layer 30, a semiconductor layer 40, and an ohmic contact layer 50 are sequentially formed by the second mask process on the substrate 10 on which the first conductive pattern group is formed.

Specifically, the gate insulating layer 30, an amorphous silicon layer, and an impurity-doped amorphous silicon layer are sequentially deposited by a deposition method such as PECVD or CVD on the substrate 10 on which the gate lines GL1 to GLn, the gate electrode 20, the storage lines SL1 to SLn, and the first to sixth storage electrodes 521 to 526 are formed. The amorphous silicon layer and the impurity-doped amorphous silicon layer are patterned by a photolithography process using a second mask and an etching process, thereby forming the semiconductor layer 40 and the ohmic contact layer 50. An inorganic insulating material, such as SiNx or oxide silicon SiOx, is used as the gate insulating layer 30. The semiconductor layer 40 may be formed by transforming the amorphous silicon layer into a poly silicon layer on a channel region by using a laser crystallization or solid phase crystallization method.

Figure 11C:
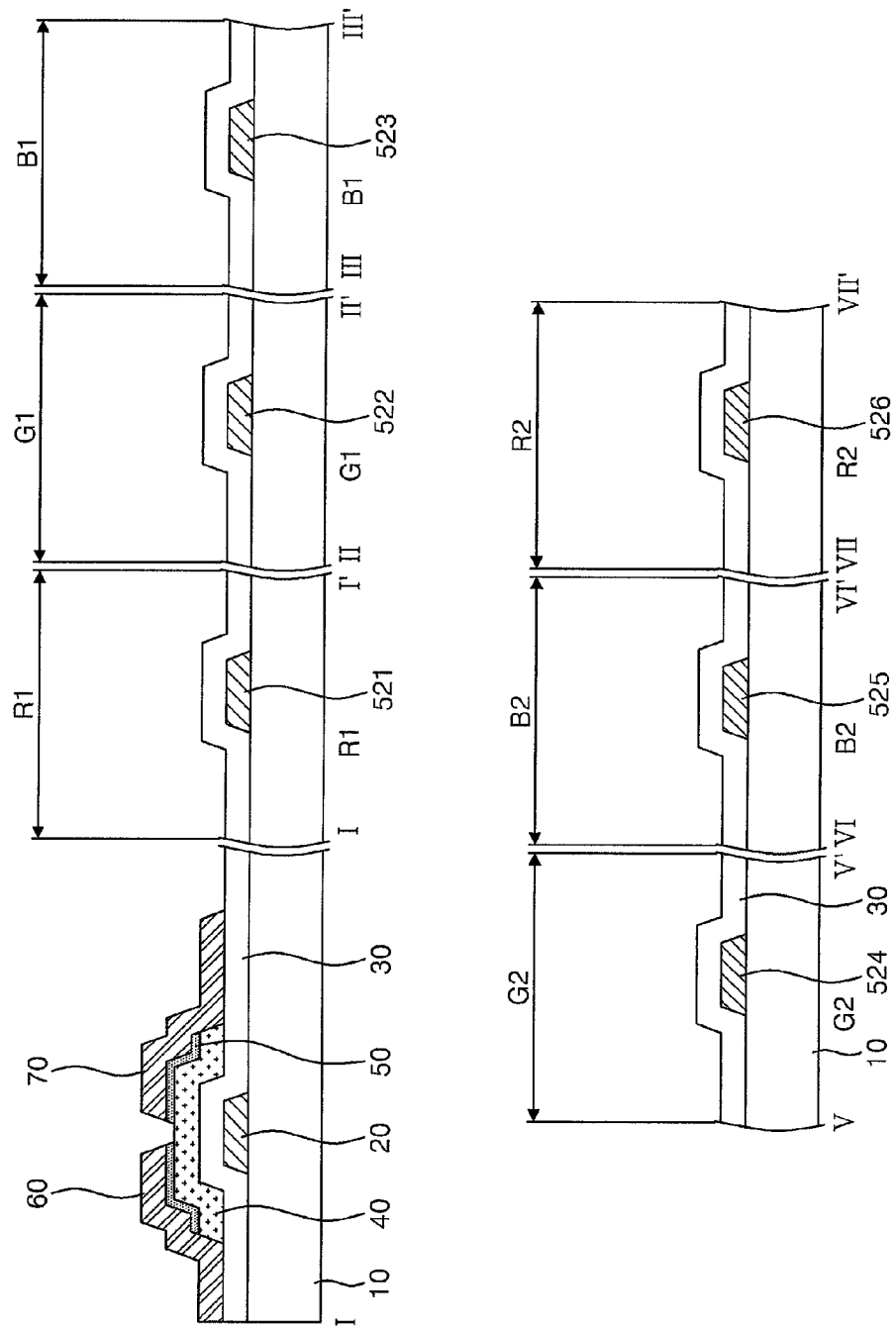

FIG. 11C illustrates a third mask process in a process for manufacturing the TFT substrate according to a second exemplary embodiment of the present invention.

Referring to FIG. 11C, a second conductive pattern group including a source electrode 60, a drain electrode 70, and data lines DL1 to DLm is formed by the third mask process on the substrate 10 on which the semiconductor layer 40, the ohmic contact layer 50, and the gate insulating layer 30 are formed.

Specifically, a second conductive layer is deposited by a deposition method such as sputtering on the substrate 10 on which the semiconductor layer 40, the ohmic contact layer 50, and the gate insulating layer 30 are formed. The second conductive pattern group is formed by patterning the second conductive layer by a photolithography process using a third mask and an etching process. The source electrode 60 and the drain electrode 70 on the ohmic contact layer 50 are formed to face each other. The data lines DL1 to DLm are formed to be connected to the source electrode 60. The second conductive layer is formed in a single layer structure composed of a metal such as Al, Cr, Cu, and Mo or an alloy thereof or formed in a multi-layer structure composed of a combination of these metals. The third mask may form a short channel by a slit mask or a semi-transmission mask of which slits are formed in a region where a channel is to be formed. The characteristics of a TFT 200 may be formed by increasing the width of a channel and decreasing the length of the channel.

FIGS. 11D to 11G illustrate a fourth mask process in a process for manufacturing the TFT substrate according to a second exemplary embodiment of the present invention.

Referring to FIGS. 11D to 11G, a pixel contact hole 90, and a passivation layer 580 for forming first to sixth storage capacitors st1 to st6 are formed by the fourth mask process on the gate insulating layer 30 on which the second conductive pattern group is formed.

Specifically, the passivation layer 580 is formed by a deposition method such as PECVD or CVD on the substrate 10 on which the second conductive pattern group is formed. The pixel contact hole 90 exposing the drain electrode 70 by penetrating the passivation layer 580 is formed by a photolithography process using a fourth mask and an etching process. The passivation layer 580 overlapping the first to sixth storage electrodes 521 to 526 is different in height. Namely, the passivation layer 580 overlapping the first to sixth storage electrodes 521 to 526 is formed to have different height by a mask 300 in which slits 303, 304, and 305 are formed in regions corresponding to the second to sixth storage electrodes 522 to 526.

Figure 11D:
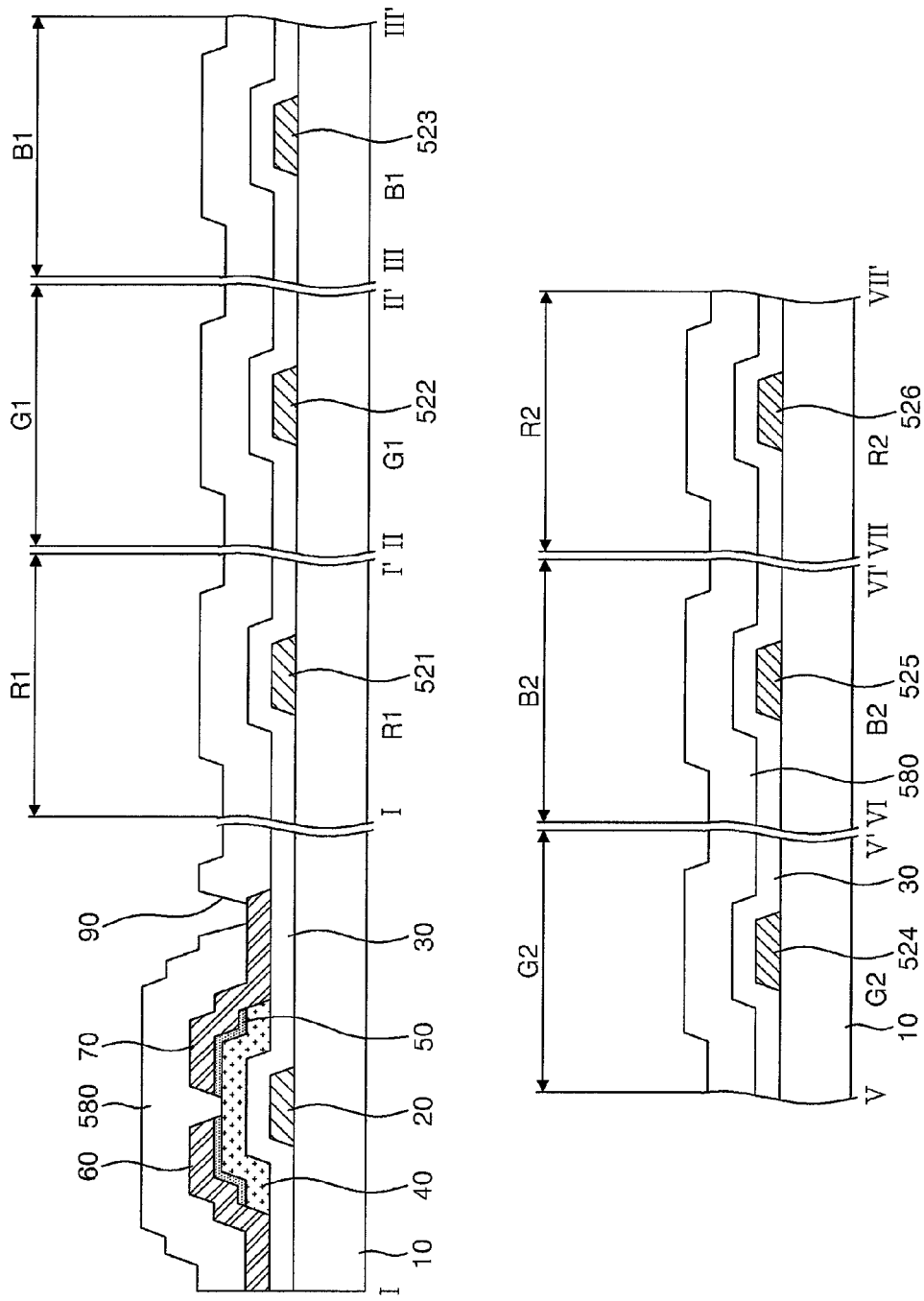
Figure 11E:
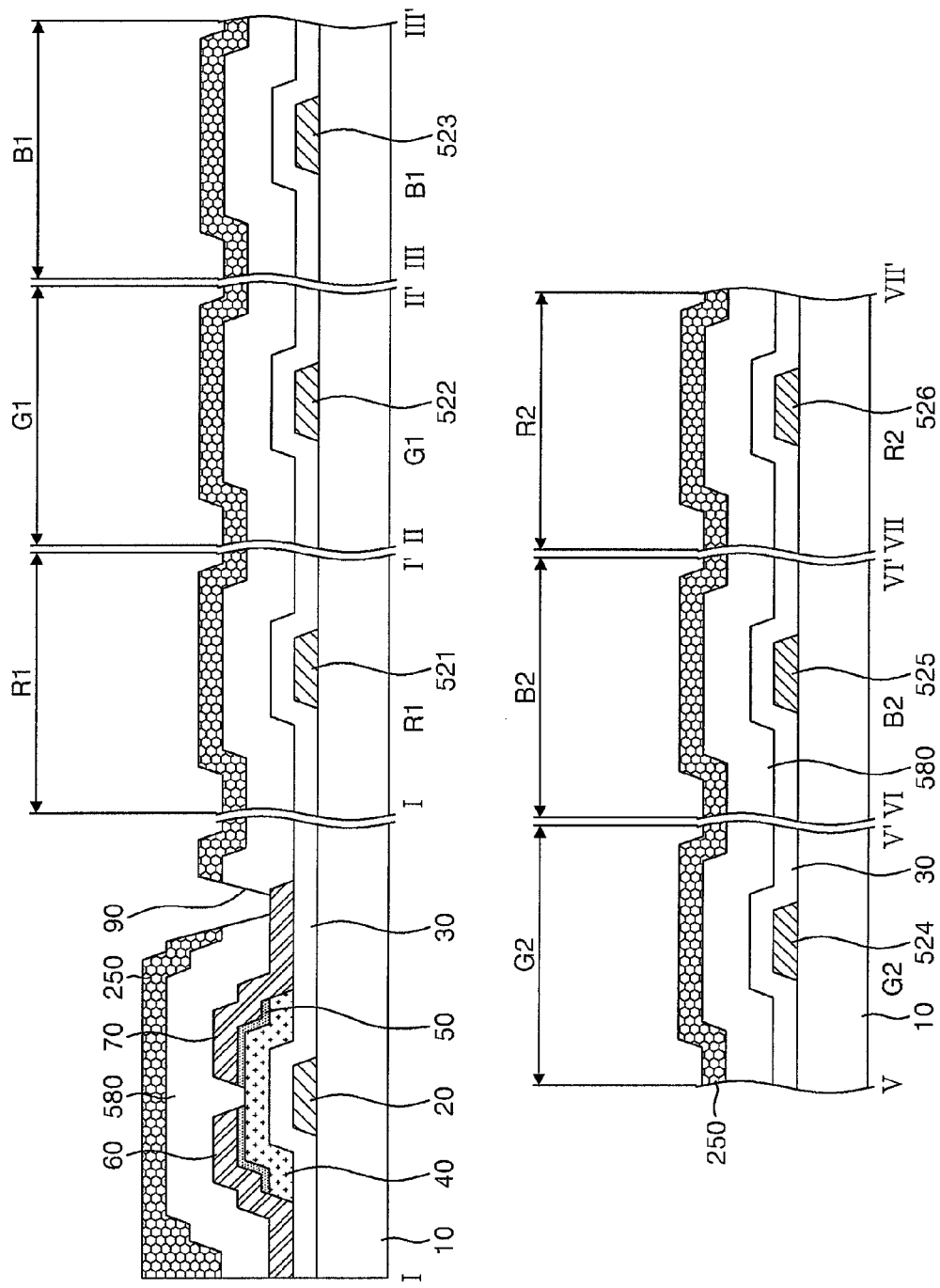

Referring to FIG. 11D, an inorganic insulating material is formed on the substrate on which the second conductive pattern is formed. Next, a photoresist 250 is formed on the inorganic insulating material as shown in FIG. 11E. Referring to FIG. 11F, the photoresist 250 of a transmission region S12 is removed and the photoresist 250 of each of a block region S11 and slit regions S13, S14, and S15 remains by photosensitizing the photoresist 250 by use of the mask 300. The photoresist 250 of the transmission region S12 is removed and the pixel contact hole 90 is formed by an etching process. As shown in FIG. 11F, sizes of the slit regions S13, S14, and S15 formed in the mask 300 are identical with each other and the number of slits 303, 304, 305 formed in the slit regions S13, S14, and S15 is set to be different. Distances D between slits of each of the slit regions S13, S14, and S15 are identical with each other. As a result, the passivation layer 580 overlapping the second to sixth storage electrodes 522 to 526 has different thickness. The blocking region S11 is formed in a region corresponding to the first storage electrode 521, and the first slit region S13 is formed in regions corresponding to the second and third storage electrodes 522 and 523. The second slit region S14 is formed in regions corresponding to the fourth and fifth storage electrodes 524 and 525, and the third slit region S15 is formed in a region corresponding to the sixth storage electrode 526. The number of slits 303 of the first slit region S13 is smaller than the number of slits 304 of the second slit region S14. Accordingly, the passivation layer 580 overlapping the fourth and fifth storage electrodes 524 and 525 is formed to have a higher height than the passivation layer 580 overlapping the second and third storage electrodes 522 and 523. The number of slits 303 of the first slit region S13 is larger than the number of slits 305 of the third slit region S15. Accordingly, the number of slits 305 of the third slit region S15 is the smallest and thus the passivation layer 580 overlapping the sixth storage electrode 526 is completely removed.

The passivation layer 580 uses an inorganic insulating material such as the gate insulating layer 30, or an organic insulating material.

Figure 11G:
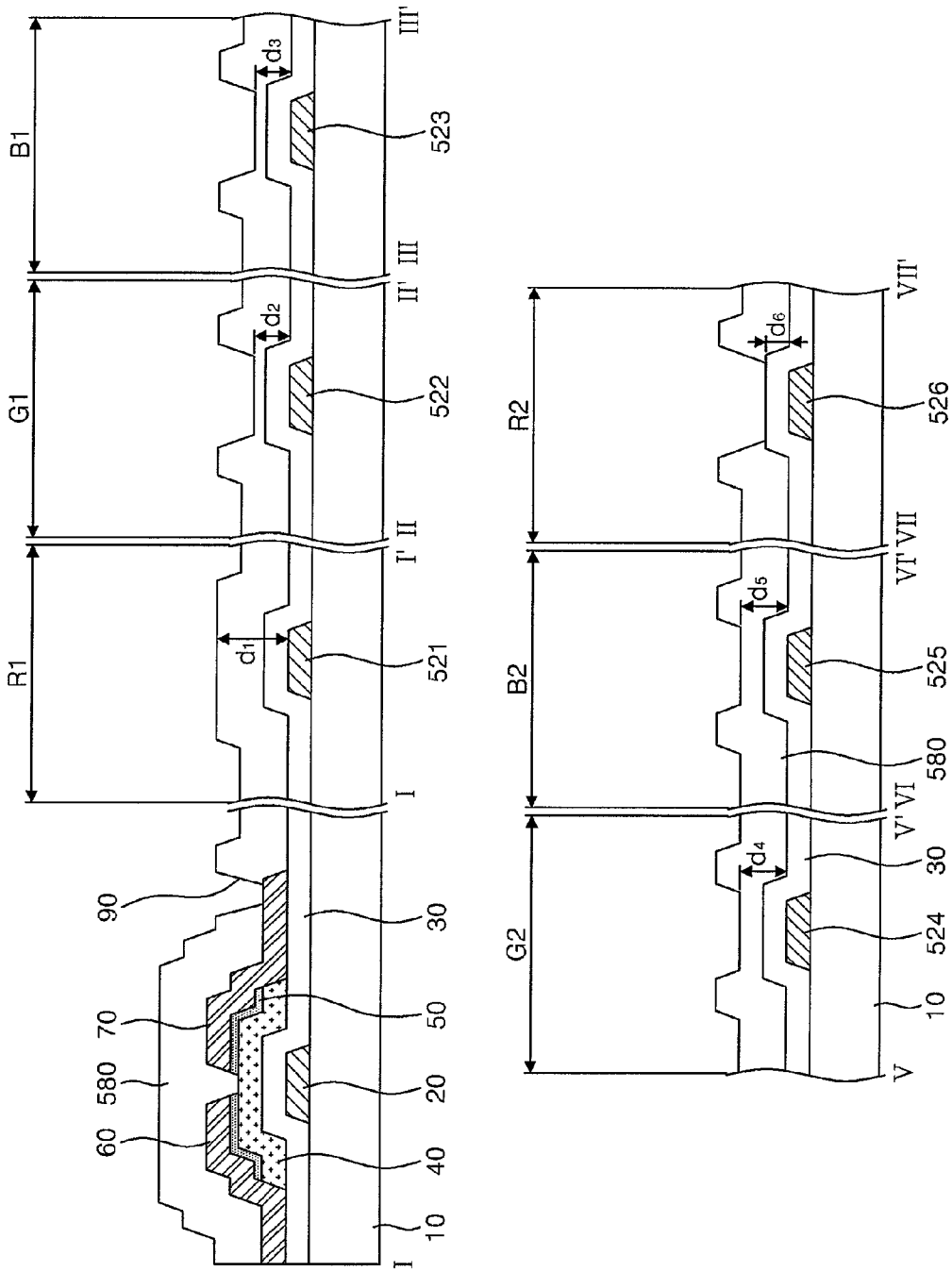

Referring to FIG. 11G, when the thickness of the passivation layer 580 is twice the thickness of the gate insulating layer 30, the sum of the thicknesses of the gate insulating layer 30 and passivation layer 580 overlapping the first storage electrode 521 is d1 and in this case the passivation layer 580 is not removed. The sum d2 of the thicknesses of the gate insulating layer 30 and passivation layer 580 overlapping the second storage electrode 522 is substantially the same as the sum d3 of the thicknesses of the gate insulating layer 30 and passivation layer 580 overlapping the third storage electrode 523. Each of the thicknesses d2 and d3 is formed to have 1/2.5 times the thickness d1 by partially removing the passivation layer 580 formed on the gate insulating layer 30. The sum d4 of the thicknesses of the gate insulating layer 30 and passivation layer 580 overlapping the fourth storage electrode 524 is substantially the same as the sum d5 of the thicknesses of the gate insulating layer 30 and passivation layer 580 overlapping the fifth storage electrode 525. Each of the thicknesses d4 and d5 is formed to have 1/1.5 times the thickness d1. Since the thickness of the passivation layer 580 overlapping the sixth storage electrode 526 should be 1/3 times the sum of the thicknesses of the gate insulating layer 30 and the passivation layer 580 overlapping the first storage electrode 521, the passivation layer 580 overlapping the sixth storage electrode 526 is removed.

FIG. 11H illustrates a fifth mask process in a process for manufacturing the TFT substrate according to a second exemplary embodiment of the present invention.

Referring to FIG. 11H, a pixel electrode 100 is formed on the passivation layer 80 by the fifth mask process.

Specifically, a transparent conductive layer is formed on the passivation layer 80 by using a deposition method such as sputtering. Next, the transparent conductive layer is patterned by a photolithography process using a fifth mask and an etching process. The transparent conductive layer uses a transparent conductive material such as ITO, IZO, TO, or ITZO. The pixel electrode 100 is connected to the drain electrode 70 through the pixel contact hole 90. The pixel electrode 100 is independently formed in a sub-pixel area. The pixel electrode 100 overlaps the first to sixth storage electrodes 521 to 526, thereby forming the first to sixth storage capacitors st1 to st6.

The TFT substrate according to the present invention is configured such that the capacitance Cst6 of the sixth storage capacitor st6 has three times the capacitance Cst1 of the first storage capacitor st1. The area of the sixth storage electrode 526 is larger than the area of the first storage electrode 521, and the thickness of the gate insulating layer 30 and passivation layer 580 overlapping the sixth storage electrode 526 is thinner than the thickness of the gate insulating layer 30 and passivation layer 580 overlapping the first storage electrode 521. The capacitances of the second to fifth storage capacitors are formed in the same manner as the capacitance of the sixth storage capacitor.

As described above, in a TFT substrate of a delta structure in which red, green, and blue sub-pixel regions of a first horizontal line are repeated, and green, blue, and red sub-pixel regions of a second horizontal line are repeated with a staggered arrangement with the sub-pixel regions of the first horizontal line, the capacitance of the sixth storage capacitor formed in the red sub-pixel region of the second horizontal line becomes three times the capacitance of the first storage capacitor formed in the red sub-pixel region of the first horizontal line. Therefore, a charging rate is compensated for and a vertical line defect is prevented.

In addition, a data driver can be simply achieved by driving three data lines by only one output node and the cost of the data driver is saved, thereby reducing the manufacturing cost of the LCD device.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display device comprising:
   sub-pixels arranged repeatedly in order of red, green, and blue along an N-th (where N is a natural number) horizontal line, and sub-pixels formed in a staggered structure with the N-th horizontal line and arranged repeatedly in order of green, blue, and red along an (N+1)-th horizontal line;
   gate lines formed along the horizontal lines;
   data lines formed to cross the gate lines with a gate insulating layer disposed therebetween and formed to be bent along the sub-pixels of the staggered structure;
   thin film transistors connected to the gate lines and to the data lines;
   pixel electrodes connected to the thin film transistors; and
   storage electrodes overlapping the pixel electrodes with the gate insulating layer and a passivation layer disposed therebetween to form red, green, and blue storage capacitors;
   wherein the capacitance of the red storage capacitor of the (N+1)-th horizontal line is greater than the capacitance of the red storage capacitor of the N-th horizontal line.

2. The liquid crystal display device of claim 1, wherein the capacitance of each of the green and blue storage capacitors of the N-th horizontal line is greater than the capacitance of the red storage capacitor of the N-th horizontal line, and the capacitance of each of the green and blue storage capacitors of the (N+1)-th horizontal line is less than the capacitance of the red storage capacitor of the (N+1)-th horizontal line.

3. The liquid crystal display device of claim 2, wherein the capacitances of the green and blue storage capacitors of the N-th horizontal line are substantially the same as each other, the capacitances of the green and blue storage capacitors of the (N+1)-th horizontal line are substantially the same as each other, and the capacitance of each of the green and blue storage capacitors of the N-th horizontal line is greater than the capacitance of each of the green and blue storage capacitors of the (N+1)-th horizontal line.

4. The liquid crystal display device of claim 3, wherein the sum of the capacitances of the red, green, and blue storage capacitors of the N-th horizontal line is substantially the same as the sum of the capacitances of the green, blue, and red storage capacitors of the (N+1)-th horizontal line.

5. The liquid crystal display device of claim 2, wherein the area of a storage electrode formed in a red sub-pixel of the (N+1)-th horizontal line is larger than the area of a storage electrode formed in a red sub-pixel of the N-th horizontal line.

6. The liquid crystal display device of claim 5, wherein the area of each of storage electrodes formed in green and blue sub-pixels of the N-th horizontal line is larger than the area of the storage electrode formed in the red sub-pixel of the N-th horizontal line, and the area of the storage electrode formed in the red sub-pixel of the (N+1)-th horizontal line is larger than the area of each of storage electrodes formed in green and blue sub-pixels of the (N+1)-th horizontal line.

7. The liquid crystal display device of claim 6, wherein the area of each of the storage electrodes formed in the green and blue sub-pixels of the N-th horizontal line is larger than the area of each of the storage electrodes formed in the green and blue sub-pixels of the (N+1)-th horizontal line.

8. The liquid crystal display device of claim 2, wherein the sum of the areas of the storage electrodes formed in the red, green, and blue sub-pixels of the N-th horizontal line is substantially the same as the sum of the areas of the storage electrodes formed in the red, green, and blue sub-pixels of the (N+1)-th horizontal line, and the thickness of a passivation layer formed between the storage electrode of the red sub-pixel of the (N+1)-th horizontal line and the pixel electrode is thinner than the thickness of a passivation layer formed between the storage electrode of the red sub-pixel of the N-th horizontal line and the pixel electrode.

9. The liquid crystal display device of claim 8, wherein the thickness of a passivation layer formed between the storage electrode of each of the blue and green sub-pixels of the N-th horizontal line and the pixel electrode is thinner than the thickness of a passivation layer formed between the storage electrode of the red sub-pixel of the N-th horizontal line and the pixel electrode, and the thickness of the passivation layer formed between the storage electrode of the red sub-pixel of the (N+1)-th horizontal line and the pixel electrode is thinner than the thickness of the passivation layer formed between the storage electrode of each of the green and blue sub-pixels of the (N+1)-th horizontal line and the pixel electrode.

10. The liquid crystal display device of claim 9, wherein the thickness of the passivation layer formed between the storage electrode of the green sub-pixel of the N-th horizontal line and the pixel electrode is substantially the same as the thickness of the passivation layer formed between the storage electrode of the blue sub-pixel of the N-th horizontal line and the pixel electrode, the thickness of a passivation layer formed between the storage electrode of the green sub-pixel of the (N+1)-th horizontal line and the pixel electrode is substantially the same as the thickness of the passivation layer formed between the storage electrode of the blue sub-pixel of the (N+1)-th horizontal line and the pixel electrode, the thickness of the passivation layer formed between the storage electrode of each of the green and blue sub-pixels of the N-th horizontal line and the pixel electrode is thinner than the thickness of the passivation layer formed between the storage electrode of each of the green and blue sub-pixels of the (N+1)-th horizontal line and the pixel electrode.

11. The liquid crystal display device of 1, further comprising:
   a gate driver supplying a scan signal to the gate lines; and
   a data driver supplying a pixel data signal to the data lines and having one output line connected to a plurality of data lines.

12. The liquid crystal display device of claim 11, further comprising a plurality of transistors connected between the one output line of the data driver and the plurality of data lines to sequentially turn on the data lines.

13. A method of manufacturing a liquid crystal display device, the method comprising:
   forming gate lines along horizontal lines in sub-pixels arranged repeatedly in order of red, green, and blue along an N-th (where N is a natural number) horizontal line, and in sub-pixels formed in a staggered structure with the N-th horizontal line and arranged repeatedly in order of green, blue, and red along an (N+1)-th horizontal line;

forming data lines which cross the gate lines with a gate insulating layer disposed therebetween, the data lines being bent along the sub-pixels of the staggered structure;

forming thin film transistors connected to the gate lines and to the data lines;

forming pixel electrodes connected to the thin film transistors; and forming storage electrodes overlapping the pixel electrodes with the gate insulating layer and a passivation layer disposed therebetween to form red, green, and blue storage capacitors;

wherein the capacitance of the red storage capacitor of the (N+1)-th horizontal line is greater than the capacitance of the red storage capacitor of the N-th horizontal line.

14. The method of claim 13, wherein the area of the storage electrode formed in a red sub-pixel of the (N+1)-th horizontal line is larger than the area of a storage electrode formed in a red sub-pixel of the N-th horizontal line.

15. The method of claim 14, where in the area of a storage electrode formed in a green sub-pixel of the N-th horizontal line is substantially the same as the area of a storage electrode formed in a blue sub-pixel of the N-th horizontal line, the area of a storage electrode formed in a green sub-pixel of the (N+1)-th horizontal line is substantially the same as the area of a storage electrode formed in a blue sub-pixel of the (N+1)-th horizontal line, the area of each of the storage electrodes formed in the green and blue sub-pixels of the N-th horizontal line is larger than the area of each of the storage electrodes formed in the green and blue sub-pixels of the (N+1)-th horizontal line, the capacitance of each of the storage electrodes formed in the green and blue sub-pixels of the N-th and (N+1)-th horizontal lines is greater than the capacitance of the storage electrode formed in the red sub-pixel of the N-th horizontal line and less than the capacitance of the storage electrode formed in the red sub-pixel of the (N+1)-th horizontal line.

16. The method of claim 13, wherein the storage electrodes are formed to have substantially the same area, and the passivation layer overlapping the storage electrodes formed in the red, green, and blue sub-pixels of the N-th and (N+1)-th horizontal lines is formed to have different thicknesses.

17. The method of claim 16, wherein the thickness of a passivation layer overlapping the storage electrode formed in the red sub-pixel of the (N+1)-th horizontal line is thinner than the thickness of a passivation layer overlapping the storage electrode formed in the red sub-pixel of the N-th horizontal line.

18. The method of claim 17, wherein the passivation layer overlapping the storage electrodes formed in the green and blue sub-pixels of the (N+1)-th horizontal line has substantially the same thickness, the thickness of the passivation layer overlapping each of the storage electrodes formed in the green and blue sub-pixels of the (N+1)-th horizontal line is thinner than the thickness of the passivation layer overlapping the storage electrode formed in the red sub-pixel of the N-th horizontal line and thicker than the thickness of the passivation layer overlapping the storage electrode formed in the red sub-pixel of the (N+1)-th horizontal line, the passivation layer overlapping the storage electrodes formed in the green and blue sub-pixels of the N-th horizontal line has the same thickness, the thickness of the passivation layer overlapping each of the storage electrodes formed in the green and blue sub-pixels of the N-th horizontal line is thinner than the thickness of the passivation layer overlapping the storage electrode formed in the red sub-pixel of the N-th horizontal line and thicker than the thickness of the passivation layer overlapping the storage electrode formed in the red sub-pixel of the (N+1)-th horizontal line.

19. The method of claim 18, further comprising;

forming a photoresist layer on the passivation layer;

patterning the photoresist layer by a mask having a first slit region corresponding to storage electrodes formed in the green and blue sub-pixels of the N-th horizontal line, a second slit region corresponding to electrodes formed in the green and blue sub-pixels of the (N+1)-th horizontal line, and a third slit region corresponding to the red storage electrode formed in the red sub-pixel of the (N+1)-th horizontal line; and etching the passivation layer by the photoresist layer;

wherein sizes of the first to third slit regions are substantially the same as each other, the number of slits of the first slit region is smaller than the number of slits of the second slit region and the number of slits of the third slit region is smaller than the number of slits of the first slit region, and distances between the slits of the first to third slit regions are identical.

20. A liquid crystal display device comprising:

sub-pixels arranged repeatedly in order of red, green, and blue along an N-th (where N is a natural number) horizontal line, and sub-pixels formed in a staggered structure with the N-th horizontal line and arranged repeatedly in order of green, blue, and red along an (N+1)-th horizontal line;

gate lines formed along the horizontal lines;

data lines formed to cross the gate lines with a gate insulating layer disposed therebetween and formed to be bent along the sub-pixels of the staggered structure;

thin film transistors connected to the gate lines and to the data lines;

pixel electrodes connected to the thin film transistors; and storage electrodes overlapping the pixel electrodes with the gate insulating layer and a passivation layer disposed therebetween to form red, green, and blue storage capacitors;

wherein the capacitances of the red, green, and blue storage capacitors of the N-th horizontal line are respectively different from the capacitances of the red, and green, blue storage capacitors of the (N+1)-th horizontal lines.

* * * * *